US008306395B2

(12) United States Patent
Okamoto et al.

(10) Patent No.: US 8,306,395 B2
(45) Date of Patent: Nov. 6, 2012

(54) INPUT-OUTPUT CIRCUIT, RECORDING APPARATUS AND REPRODUCTION APPARATUS FOR DIGITAL VIDEO SIGNAL

(75) Inventors: Hiroo Okamoto, Yokohama (JP); Kyoichi Hosokawa, Yokohama (JP); Hitoaki Owashi, Yokohama (JP); Hiroaki Tachibana, Chigasaki (JP); Takaharu Noguchi, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1396 days.

(21) Appl. No.: 11/936,852

(22) Filed: Nov. 8, 2007

(65) Prior Publication Data

US 2010/0027962 A1 Feb. 4, 2010

Related U.S. Application Data

(60) Continuation of application No. 10/367,730, filed on Feb. 19, 2003, now Pat. No. 7,319,808, which is a continuation of application No. 09/455,413, filed on Dec. 6, 1999, now Pat. No. 6,600,870, which is a division of application No. 08/972,457, filed on Nov. 18, 1997, now Pat. No. 6,041,161, which is a division of application No. 08/547,662, filed on Oct. 24, 1995, now abandoned.

(30) Foreign Application Priority Data

Oct. 28, 1994 (JP) .................................... 06-264874
Jun. 7, 1995 (JP) .................................... 07-140294

(51) Int. Cl.
*H04N 9/88* (2006.01)

(52) U.S. Cl. ........................................ 386/263; 386/264
(58) Field of Classification Search .................. 386/263, 386/264, 318, 201, 202, 207, 222
See application file for complete search history.

(56) References Cited

U.S. PATENT DOCUMENTS 3,773,979 A 11/1973 Kirk, Jr. et al. ................ 348/724
4,499,568 A 2/1985 Gremillet ........................ 369/30
(Continued)

FOREIGN PATENT DOCUMENTS

DE 4335271 5/1994
(Continued)

OTHER PUBLICATIONS

"Data Compression and Digital Modulation", Nikkei BP, pp. 137-150.
(Continued)

*Primary Examiner* — Robert Chevalier
(74) *Attorney, Agent, or Firm* — Brundidge & Stanger, P.C.

(57) ABSTRACT

A video signal input-output circuit and a recording-reproduction apparatus in which a digitally compressed video signal input in packet form can be recorded and reproduced efficiently and in stable fashion. In this apparatus, a clock reference is detected from a packet signal containing the clock reference and a digitally compressed video signal, a time stamp for a packet is generated using a clock signal in phase with the clock reference and added to the particular packet, and the packet signals with the time stamp added thereto are recorded closely to each other in a data storage element such as a magnetic recording medium. At playback, the packet interval is output by being restored to the original length on the basis of the time stamp added to the packet in store.

2 Claims, 23 Drawing Sheets

U.S. PATENT DOCUMENTS

| | | | | |
|---|---|---|---|---|
| 4,591,924 | A | 5/1986 | Miura et al. | 358/330 |
| 4,631,603 | A | 12/1986 | Ryan | 360/37.1 |
| 4,694,490 | A | 9/1987 | Harvey | 380/20 |
| 4,704,725 | A | 11/1987 | Harvey | 380/9 |
| 4,706,121 | A | 11/1987 | Young | 358/142 |
| 4,751,578 | A | 6/1988 | Reiter et al. | 358/183 |
| 4,755,889 | A | 7/1988 | Schwartz | |
| 4,807,055 | A | 2/1989 | Tsunoda et al. | 386/104 |
| 4,908,713 | A | 3/1990 | Levine | 358/335 |
| 4,914,527 | A | 4/1990 | Asai et al. | |
| 4,945,563 | A | 7/1990 | Horton et al. | 380/5 |
| 4,963,994 | A | 10/1990 | Levine | 358/335 |
| 4,965,825 | A | 10/1990 | Harvey | 380/9 |
| 4,977,455 | A | 12/1990 | Young | 358/142 |
| 4,991,208 | A | 2/1991 | Walker et al. | 380/20 |
| 5,038,211 | A | 8/1991 | Hallenbeck | 358/142 |
| 5,046,092 | A | 9/1991 | Walker et al. | 380/20 |
| 5,065,259 | A | 11/1991 | Kubota et al. | 386/7 |
| 5,109,414 | A | 4/1992 | Harvey | 380/9 |
| 5,134,496 | A | 7/1992 | Schwab et al. | 380/5 X |
| 5,151,789 | A | 9/1992 | Young | 58/194.1 |
| 5,224,087 | A | 6/1993 | Maeda et al. | 369/54 |
| 5,233,654 | A | 8/1993 | Harvey | 380/20 |
| 5,289,288 | A | 2/1994 | Silverman et al. | 386/97 |
| 5,293,357 | A | 3/1994 | Hallenbeck | 348/734 |
| 5,313,342 | A | 5/1994 | Soda et al. | 360/63 |
| 5,319,501 | A | 6/1994 | Mitsuhashi | 386/101 |
| 5,359,428 | A | 10/1994 | Kubota et al. | 386/33 |
| 5,418,853 | A | 5/1995 | Kanota et al. | 380/5 |
| 5,432,646 | A | 7/1995 | Nakamura et al. | |
| 5,438,463 | A | 8/1995 | Nishiumi et al. | 386/96 |
| 5,442,390 | A | 8/1995 | Hooper et al. | |
| 5,477,396 | A | 12/1995 | Fukami et al. | |
| 5,479,268 | A | 12/1995 | Young | 358/335 |
| 5,497,420 | A | 3/1996 | Garneau | 380/20 |
| 5,502,573 | A | 3/1996 | Fujinami | |
| 5,508,815 | A | 4/1996 | Levine | 358/335 |
| 5,511,054 | A | 4/1996 | Oishi et al. | |
| 5,519,544 | A | 5/1996 | Hara | 86/96 |
| 5,537,408 | A | 7/1996 | Branstad et al. | |
| 5,548,410 | A | 8/1996 | Kim et al. | 386/104 |
| 5,555,308 | A | 9/1996 | Levien | 380/20 |
| 5,565,924 | A | 10/1996 | Haskell et al. | |
| 5,568,272 | A | 10/1996 | Levine | 386/48 |
| 5,568,403 | A | 10/1996 | Deiss et al. | |
| 5,572,331 | A | 11/1996 | Yu | |
| 5,572,333 | A | 11/1996 | Moriyama et al. | 386/98 |
| 5,583,652 | A * | 12/1996 | Ware | 386/206 |
| 5,596,581 | A | 1/1997 | Saeijs et al. | |
| 5,719,943 | A | 2/1998 | Amada et al. | 380/49 |
| 5,815,634 | A | 9/1998 | Daum et al. | 386/96 |
| 5,878,010 | A | 3/1999 | Okamoto et al. | 369/59 |
| 5,903,704 | A | 5/1999 | Owashi et al. | 386/95 |
| 6,041,161 | A | 3/2000 | Okamoto et al. | 386/112 |
| 6,115,537 | A | 9/2000 | Yamada et al. | 386/109 |
| 6,600,870 | B1 | 7/2003 | Okamoto et al. | |

FOREIGN PATENT DOCUMENTS

| | | |
|---|---|---|
| EP | 0338866 | 10/1989 |
| EP | 0450841 | 10/1991 |
| EP | 0489375 | 6/1992 |
| EP | 0506435 | 9/1992 |
| EP | 0565305 | 10/1993 |
| EP | 0577329 | 1/1994 |
| EP | 0589459 | 3/1994 |
| EP | 0602897 | 6/1994 |
| EP | 0606180 | 7/1994 |
| EP | 0618695 | 10/1994 |
| EP | 0624983 | 11/1994 |
| EP | 0661876 | 7/1995 |
| EP | 0710021 | 5/1996 |
| JP | 42196133 | 8/1992 |
| JP | 4360068 | 12/1992 |
| JP | 5174496 | 7/1993 |
| JP | 5207507 | 8/1993 |
| JP | 406303254 A * | 10/1994 |
| WO | 9102419 | 2/1991 |
| WO | 9418776 | 8/1994 |
| WO | 9527977 10 | 10/1995 |

OTHER PUBLICATIONS

Chao H.J. et al, "Asynchronous Transfer Mode Packet Video Transmission System", Optical Engineeri vol. 28, No. 7, Jul. 1989, pp. 781-788.

International Organization for Standardization Organization Internationale De Normalization ISO/IEC JTC1/SC29/WG11 Coding of Moving Pictures and Associated Audio, Mar. 1992, pp. 35-39.

Patent Abstract of Japan vol. 14, No. 44, (P-1003), Feb. 7, 1990 & JP 01 287857 A (Victor Company of Japan), Nov. 20, 1989.

Patent Abstract of Japan, vol. 12, No. 486 (E-695), Dec. 19, 1998 & JP 63 202286 (Matsushita Electric Industrial), Aug. 22, 1988.

Riemann U: Der MPEG-2-Standard, vol. 48, No. 10, Oct. 1, 1994, pp. 545-550.

Grand Alliance HDTV System Specification (Draft Document) Submitted to the ACATS Technical Subgroup dated Feb. 22, 1994.

M. Harada, "5-3 Future View of CATV", Journal of the Institute of Television Engineers of Japan., vol. 47, No. 4, 1993, pp. 494-499.

"Information Technology—Coding of Moving Pictures and Associated Audio for Digital Stor Media at up to about 1,5 Mbit/s", International Standard, ISO/IEC 11172.1: 1993(e), pp. 1 and 25.

Notification of European Publication No. and Information on the Application of Article 67(3) EPC.

Transactions The Institute of Television Engineers of Japan, vol. 46, No. 1, pp. 31-39, 1992.

Little, et al "A Digital on-Demand Video Service Supporting Content-based Queries", ACM Multimedia 93, pp. 427-436, Jul. 1993.

European Search Report; Jan. 15, 1999.

* cited by examiner

FIG. 7

(1) V1 | V2 | V3 | A1 | PG | V/ECM | V3 | V4 | A2 | A/ECM | V1 | A3 | A4

(2) V4 | A2 | V1 | V3 | A1 | V4 | V1 | V4 | A4 | V3 | V4

(3) A2 | PG | V2 | V4 | V2 | V1 | V/ECM | V3 | A3 | V2 | A/ECM | A4 | A1

...

(n) V1 | V2 | A1 | V/ECM | A/ECM | PG | V1 | V4 | A2 | V3 | V1 | A3 | A4

INPUT-OUTPUT CIRCUIT, RECORDING APPARATUS AND REPRODUCTION APPARATUS FOR DIGITAL VIDEO SIGNAL

The present application is a continuation of application Ser. No. 10/367,730, filed Feb. 19, 2003 now U.S. Pat. No. 7,319,808; which is a continuation of application Ser. No. 09/455,413, filed Dec. 6, 1999, now U.S. Pat. No. 6,600,870; which is a divisional application of Ser. No. 08/972,457, filed Nov. 18, 1997, now U.S. Pat. No. 6,041,161; which is a divisional application of Ser. No. 08/547,662, filed Oct. 24, 1995, now abandoned, the contents of which are incorporated herein by reference.

BACKGROUND OF THE INVENTION

The present invention relates to transmission-receiving techniques and recording-reproduction techniques for signals between apparatuses, or more in particular to an output circuit, a recording apparatus and a reproduction apparatus for digital video signals, in which the digital information signal for moving pictures, programs or the like transmitted by transmission means such as coaxial cable, optical cable, telephone channel or satellite broadcast are received and the received signals are exchanged between apparatuses.

A recording-reproduction apparatus for digital video signals is disclosed, for example, in JP-A-1-258255 (U.S. Pat. No. 5,065,259).

Also, an ITU-T Draft Rec. H.262 standard called MPEG-2 (Moving Picture Experts Group) is known as a scheme for digitally compressing the video signal at high efficiency. On the other hand, a MPEG-2 Systems Working Draft is known as a transmission standard for the video signal and the audio signal compressed by MPEG-2.

The above-mentioned standards present a technique for compressing a program and broadcasting it digitally. The use of this compression scheme with a high compression ratio allows broadcasting of four to eight times more programs than the conventional analog broadcast in the same transmission channel. As a result, a digital satellite service or a similar service called the Near Video On-Demand in which moving pictures of two hours are broadcast repeatedly in 30 minute shifts, for example, has already started in the U.S. Since all programs cannot be broadcast by the Near Video On-Demand service throughout the day, however, there still is a demand for video-recording broadcast signals and viewing programs by playback at convenient times as in the prior art.

A method for recording and reproducing a program which is digitally compressed and digitally broadcast may include decompressing the received digital signal and after converting it into an analog signal, recording it in the conventional analog VTR. The conversion into an analog signal and video-recording by analog VTR spoils the valuable high signal-to-noise ratio of the digital signal.

JP-A-1-258255 discloses a technique for A/D converting an analog video signal input and digitally recording it after bit reduction. In the case of digital broadcasting, however, a high-efficiency digital compression is already employed, and therefore, the decompression and digital recording of the signal as disclosed in the aforementioned publication JP-A-1-258255 fails to obtain a sufficient compression efficiency, or the use of such a high-efficiency digital compressor as used in broadcasting stations for each VTR has a great cost.

It is desired to digitally record the digitally broadcast signal directly. According to the aforementioned MPEG standard, for example, a signal is compressed and the compressed signal is transmitted as packets in a transport stream format. Nevertheless, any technique for recording the digital signal thus transmitted is not yet disclosed.

A digital signal recording apparatus for recording a digitally compressed video signal on the magnetic tape using a rotary head is disclosed in JP-A-5-174496. Measures against recording signals of different transmission rates and signals of different types are not taken into consideration by such an apparatus.

SUMMARY OF THE INVENTION

An object of the present invention is to provide an apparatus capable of efficiently recording and reproducing signals compressed according to the MPEG standard, for example, and transmitted.

Another object of the invention is to provide a receiving apparatus and a recording-reproduction apparatus for digital broadcast and a low-cost interfacing circuit.

Still another object of the present invention is to provide an digital signal input-output circuit which can meet any difference in the transmission rate or the format of the recording signal.

According to one aspect of the invention, there is provided a digital video signal input-output circuit for intermittently inputting and outputting a digitally compressed video signal in packet format by a clock signal of a predetermined frequency, wherein the frequency of the clock signal is set to an integer multiple of the rotational speed of the rotary head of the recording-reproducing apparatus, the frame frequency or the field frequency of the video signal.

According to another aspect of the invention, there is provided an output circuit for applying a digital video signal to a data storage apparatus such as a recording medium and intermittently outputting a digitally compressed video signal packet form including a time stamp, comprising means for detecting a clock reference from a digitally compressed video signal containing the clock reference, means for generating a clock signal in phase with the detected clock reference, means for adding to the packet a time stamp defined as information representing the relative time of transmission of packets according to the clock signal thus generated, and means for outputting a packet of the digitally compressed video signal with a time stamp added thereto.

According to still another aspect of the invention, there is provided an apparatus for recording a digitally compressed video signal containing a clock reference intermittently transmitted in packets having a time stamp as an input signal by means of a rotary head on a magnetic recording medium, comprising means for generating a reference signal for controlling the rotation of the rotary head in phase with the time stamp and means for controlling the rotation of the rotary head on the basis of the rotation control reference signal.

According to a further aspect of the invention, there is provided an apparatus for reproducing a digitally compressed video signal containing a clock reference as an input signal recorded on a magnetic recording medium by a rotary head in phase with the time stamp in a packet, comprising means for reproducing the recorded signal, a local oscillator, temporal adjust means for outputting a packet signal reproduced in accordance with the time stamp contained in the reproduced signal on the basis of the output signal of the local oscillator, a circuit for frequency-dividing the output signal of the local oscillator, and means for controlling the rotation of the rotary head according to the output signal of the frequency-dividing circuit.

In operation, an apparatus having the above-mentioned configuration detects the clock reference contained in the digitally compressed signal and generates a clock signal in phase with the clock reference, thereby producing a clock signal in phase with the digitally compressed signal. A time stamp providing time information generated using this clock signal is added to the signal packet, whereby a time stamp in synchronization with the digitally compressed signal can be added to the signal packet.

Further, a signal recording operation in synchronization with a digital signal can be effected by generating a rotation control reference signal in phase with the time stamp added to the packet signal and by controlling the rotation of the rotary head in accordance with the reference signal.

Furthermore, in reproducing the signal recorded this way, the reproduced signal is temporally adjusted in accordance with the clock signal generated by a local oscillator, and the time interval of packet signals thus can be securely restored. Also, the rotation of the rotary head is controlled by use of the particular clock signal, whereby any overage or shortage between a reproduced signal and an output signal is eliminated, thereby realizing a stable reproduction of digital signals.

Other objects, features and advantages of the present invention will become apparent from the following description of embodiments of the invention taken in conjunction with the accompanying drawings.

BRIEF DESCRIPTION OF THE DRAWINGS

FIG. 7 shows signal waveforms according to the invention

FIG. 30 is a diagram showing connections between the digital signal recording-reproduction apparatus shown in FIG. 19, a digital broadcast receiver and other digital signal recording-reproduction apparatuses or the like.

DESCRIPTION OF THE PREFERRED EMBODIMENTS

Figure 1:
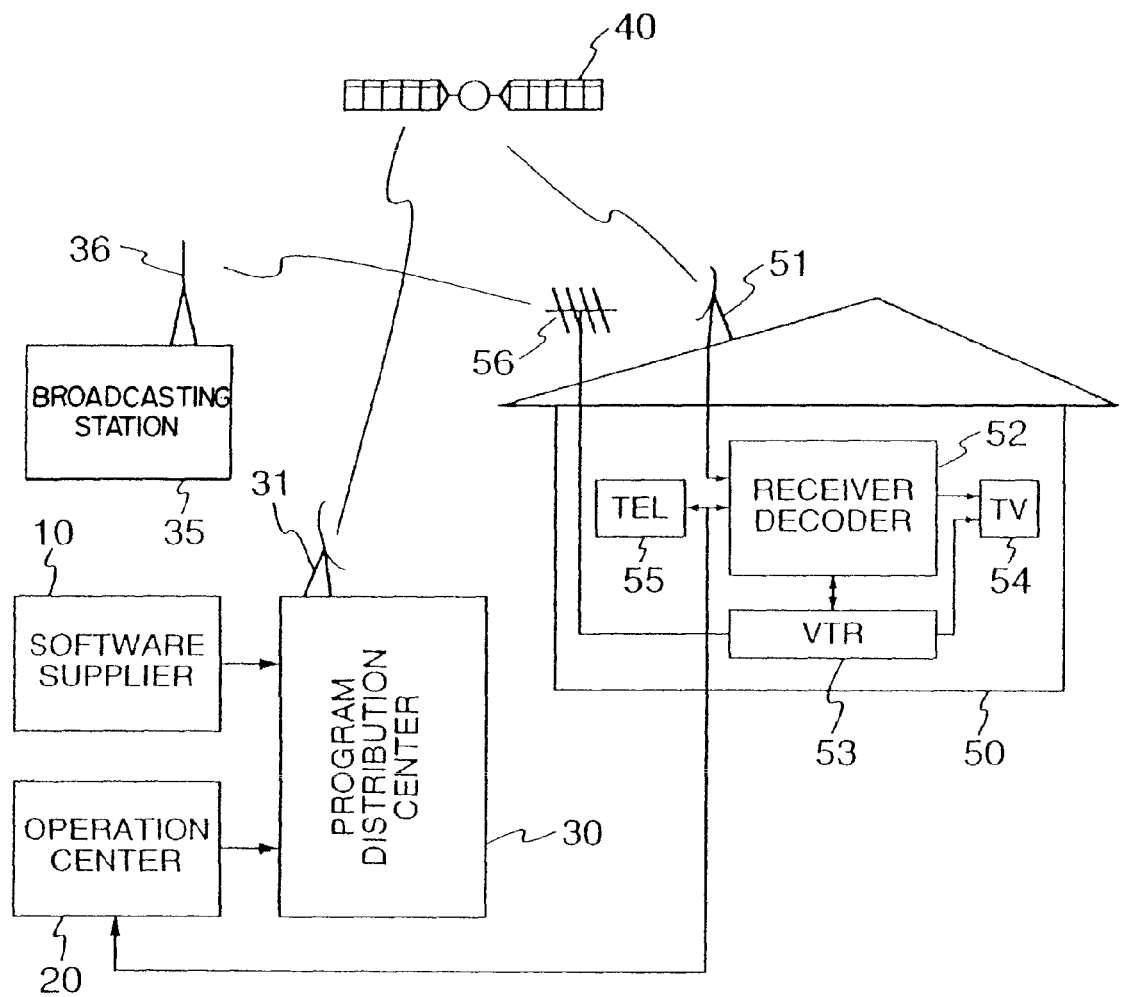
FIG. 1 is a block diagram showing a digital broadcast system and an analog broadcast system to which the invention is applied.

A video distribution service using a satellite according to an embodiment of the invention will be described with reference to FIG. 1. In FIG. 1, a reference numeral 110 designates a software supplier, numeral 20 an operation center, numeral 30 a program distribution center, numeral 31 a transmitter, numeral 35 a current broadcasting station, numeral 36 a transmitter, numeral 40 an artificial satellite for distributing signals, numeral 50 a subscriber household, numeral 51 a receiver, numeral 52 a receiver decoder, numeral 53 a VTR, numeral 54 a TV receiver, numeral 55 a telephone set, and numeral 56 a receiver.

The video distribution service is carried out by an operator managing the operation center 20. The operator signs a contract with the software supplier 10 and causes the required software to be supplied from the software supplier 10 to the program distribution center 30. According to the embodiment shown in FIG. 1, only one supplier 10 is shown. Normally, however, a plurality of software suppliers are engaged in supplying software.

The program distribution center 30 transmits a radio wave toward the satellite 40 by means of the transmitter 31 installed in the center 30. The satellite 40 receives the radio wave and retransmits it toward the subscriber 50. The radio wave thus transmitted is received by the receiver 51. According to the embodiment shown in FIG. 1, only one subscriber 50 is shown. Normally, however, a plurality of subscribers exist.

The radio wave received by the receiver 51 is applied to the receiver decoder 52, and the software of a predetermined channel is selected by the receiver decoder 52. The software thus selected is recorded in the VTR 53 as required. The signal recorded in the VTR 53 and reproduced at the desired time is returned to the receiver decoder 52, restored into the original video signal, and applied to the TV receiver 54. When the subscriber desires to watch the program without recording, the original video signal is restored without the VTR 53 and applied to the TV receiver 54.

The subscriber may request desired software from the operation center 20 by way of the telephone 55. Also, the operation center 20 can survey the receiving and viewing conditions of the subscriber 50 through the telephone channel from the receiver decoder 52 and charge the subscriber 50 in accordance with the viewing conditions.

Further, the radio wave transmitted from the current broadcast station 35 by the transmitter 36 is received by the receiver 56 and the received signal is input and recorded in the VTR 53. The signal reproduced in the VTR 53 may be applied to the TV receiver 54 to view the program. When the VTR 53 is not required to record the program, the signal from the receiver 56 is of course applied to the TV receiver 54 and the program can be viewed directly.

Figure 2:
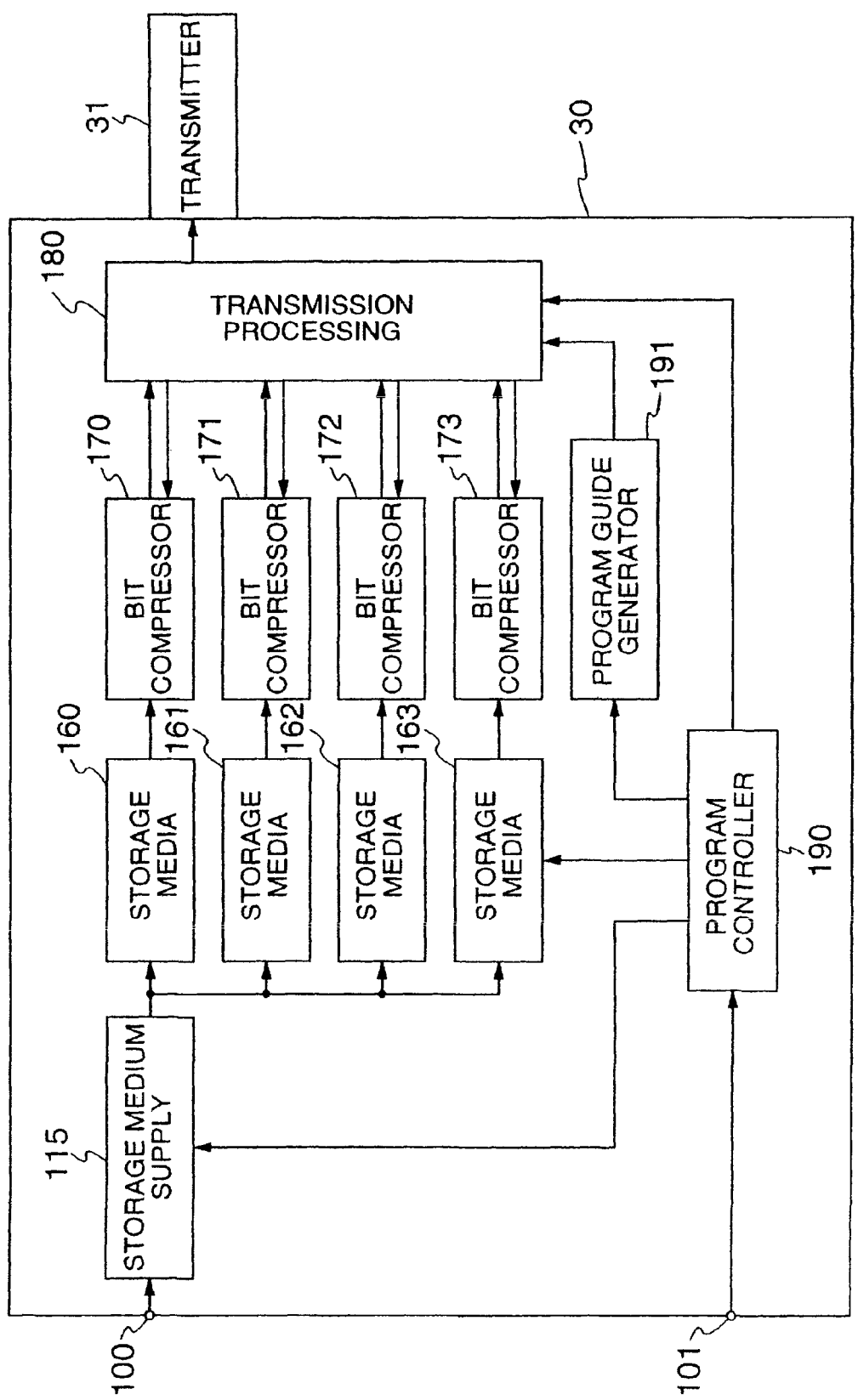
FIG. 2 is a block diagram showing a program distribution center according to an embodiment of the invention.

FIG. 2 is a block diagram showing the program distribution center 30 according to an embodiment in detail. In FIG. 2, numeral 100 designates input means for software sent from the software supplier 10, numeral 101 input means for a control signal for the program or the like sent from the operation center 20, numeral 115 a supply unit for a storage medium, numerals 160 to 163 storage media, numerals 170 to 173 bit compressors, numeral 180 a transmission processing device, numeral 190 a program controller, and numeral 191 a program guide generator.

The embodiment shown in FIG. 2 represents the case in which software is sent from the software supplier 10 in a storage medium. In this case, the terminal 100 acts only as a window for receiving the storage medium by the program distribution center 30. The storage medium thus received is stored in a storage medium supply unit 115 and is supplied to the storage media 160 to 163 under the control of the program controller 190. The signals reproduced at the storage media 160 to 163 are applied respectively to the bit compressors 170 to 173, where they are bit-compressed according to the MPEG-2 standard. The output signal of the compressors 170 to 173 is applied to the transmission processing device 180.

Also, a control signal for the program issued is applied from the operation center 20 through the input means 101 to the program controller 190. The program issue control signal from the program controller 190 is applied to the storage medium supply unit 115, the storage media 160 to 163 and the transmission processing device 180. In accordance with this control signal, as described above, the storage medium in the storage medium supply unit 115 is supplied to the storage media 160 to 163 to thereby control the reproduction, termination, etc. of the software of the storage media 160 to 163.

Further, the guide information for the program distributed to the subscriber 50 from the program distribution center 30 is generated in the program guide generator 191 in accordance with the information from the program controller 190, and applied to the transmission processing device 180. The transmission processing device 180 process signals for transmission in accordance with, for example, the MPEG transmission standard described above. The signal thus processed for transmission is applied to the transmitter 31 and transmitted toward the satellite 40 from the transmitter 31.

Figure 3:
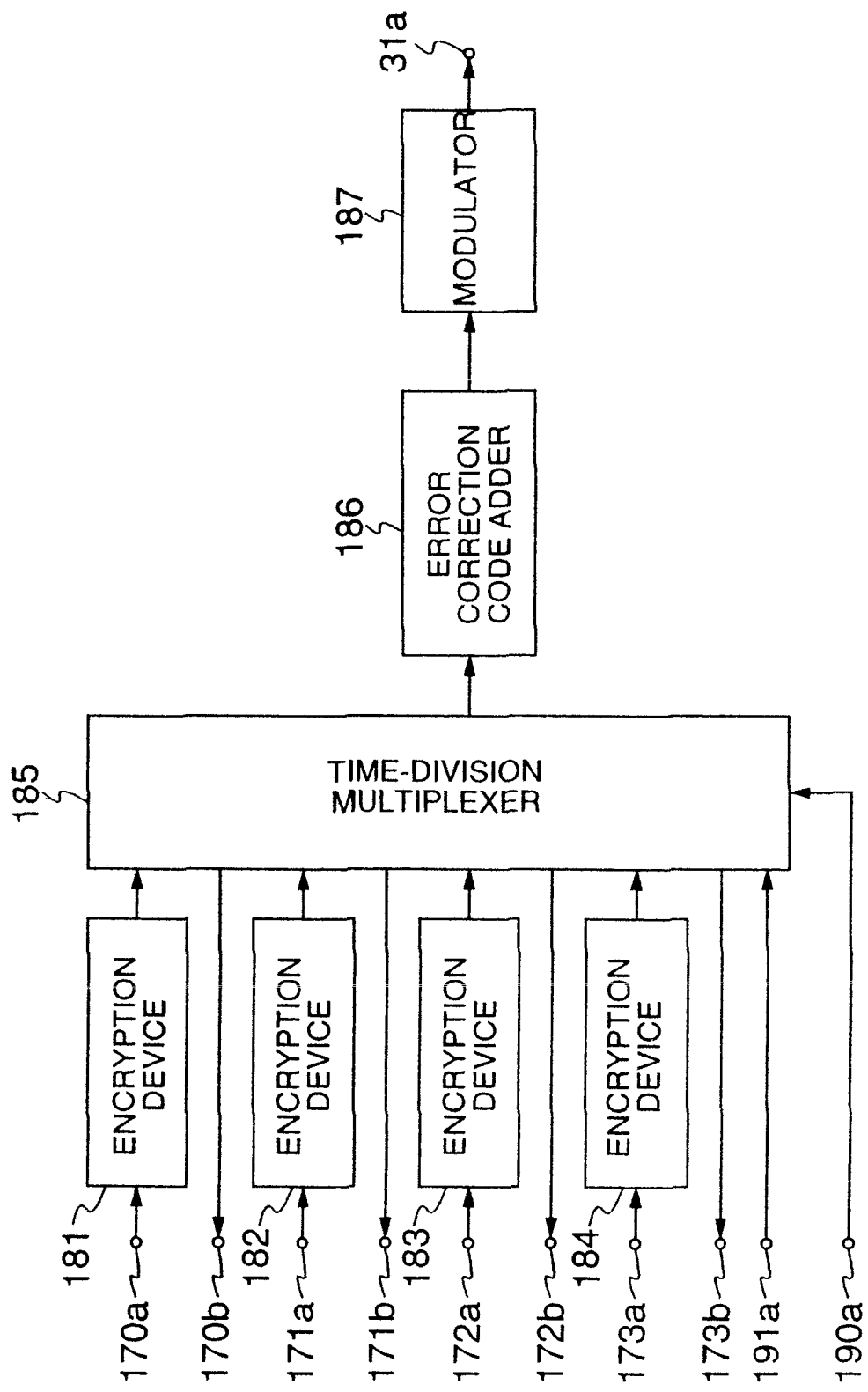
FIG. 3 is a block diagram showing a transmission processing device according to an embodiment of the invention.

FIG. 3 is a block diagram showing an example of the signal processing operation in the transmission processing device 180. In FIG. 3, numerals 170a to 173a, 190a, 191a designate input terminals, numerals 170b to 173b, 31a output terminals, numerals 181 to 184 encrypters, numeral 185 a time-division multiplexer, numeral 186 an error correction code adder, and numeral 187 a modulator.

In FIG. 3, the signals from the bit compressors 170a to 173 are applied through the input terminals 170a to 173a to the encrypters 181 to 184, respectively. The encrypters 181 to 184 encrypt the supplied programs as required. This encryption may be effected only on the video signal or the audio signal, or on both the video signal and the audio signal. The signal thus encrypted is applied to a time-division multiplexer 185. The terminal 190a is an input terminal for the signals from the program controller 190. The viewing right control signal (i.e. video and audio entitlement control message) for each program is applied through the terminal 190a to the time-division multiplexer 185. This signal includes a signal indicating whether a particular subscriber has the viewing right for the signal broadcast. Further, the time-division multiplexer 185 is supplied with program guide information from a program guide generator 191 through the input terminal 191a. Each signal is packeted in a predetermined format and compressed and multiplexed temporally. According to this embodiment, the viewing right control signal and the program guide information are shown without an encrypter. These signals, however, may also be encrypted.

The rate control information for each program is applied through the terminal 190a. This is the information for bit-compressing the program input from the bit compressor 170 in the range of 4 to 8 Mbps, and the program input from the bit compressor 171 in the range of 2 to 6 Mbps, for example. According to this information, the time-division multiplexer 185 controls the bit rate of the bit compressors 170 to 173. The time-division multiplexer 185 applies a control signal to the bit compressors 170 to 173 through the output terminals 170b to 173b. As a result, the bit rate of each program is controlled in such a way that the signal rate after time-division multiplexing is less than a predetermined value.

The output signal of the time-division multiplexer 185 is applied to the error correction code adder 186. In the case under consideration, an error correction code is added for correcting the transmission error caused by the noise in a satellite channel shown in FIG. 1, a CATV channel, which is not shown, or a telephone line. The output signal of the error correction coder is applied to the modulator 187, and in the case of the embodiment shown in FIG. 3, the programs of four channels are modulated on a single carrier thereby constituting a single transmission channel. The signal modulated on the single carrier is sent toward the transmitter 31 through the terminal 31a.

Although the embodiment shown in FIG. 2 has four storage media so that the transmission processing device 180 can be supplied with four programs, more programs can be time-division multiplexed by use of more storage media.

According to the embodiment shown in FIG. 2, signals for a single transmission channel are processed. Instead, signals for a plurality of transmission channels can be sent by providing a plurality of combinations of the storage media 160 to 163, the bit compressors 170 to 173 and the transmission processing device 180.

The transmission channel is defined as a signal modulated on a single carrier by time-division multiplexing a plurality of programs as described above. Each of a plurality of programs is referred to simply as a channel.

Figure 4:
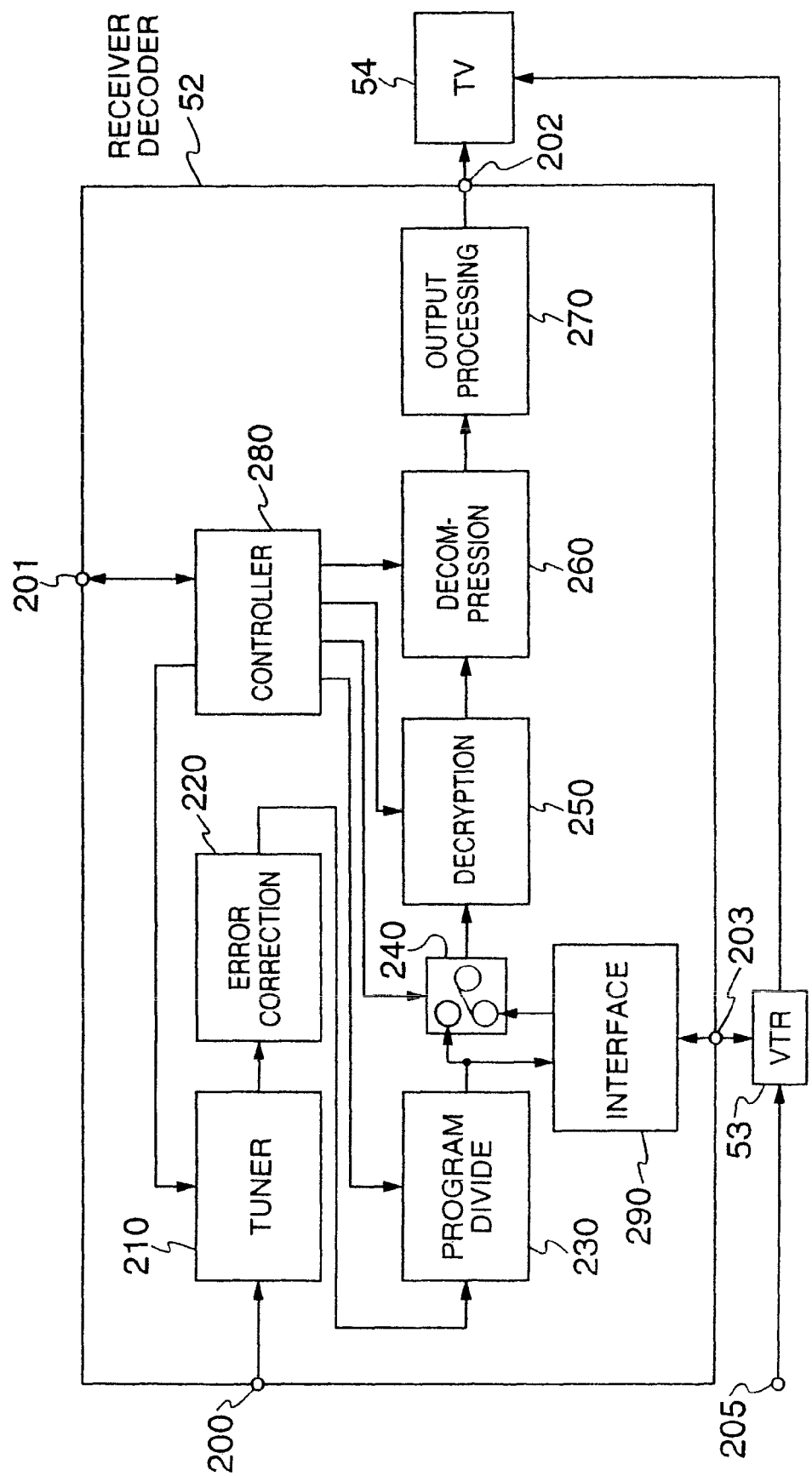
FIG. 4 is a block diagram showing a receiver decoder according to an embodiment of the invention.

FIG. 4 shows a specific example of the configuration of a receiver decoder at the subscriber household 50 (FIG. 1). In FIG. 4, numeral 200 designates an input terminal for a signal from the receiver 51, numeral 201 an input-output terminal for a signal for requesting a software from the operation center or a signal for exchanging the signal for determining the receiving conditions of a fee-charging broadcast, numeral 202 an output terminal for a signal restored, numeral 203 an input-output terminal for a signal exchanged with the VTR, numeral 205 an input terminal for a signal from the receiver 56 shown in FIG. 1, numeral 210 a tuner, numeral 220 an error correction circuit, 230 a program dividing circuit, numeral 240 a change-over circuit, numeral 250 a decryption circuit, numeral 260 a decoding circuit for bit expansion, numeral 270 a signal output processing circuit, numeral 280 a control circuit, and numeral 290 an interface circuit.

The receiver 51 that has received a signal from the satellite 40 applies the received signal to the tuner 210 through the terminal 200. The tuner 210 selects from among the received signals the signal of a desired transmission channel in accordance with the control signal from the control circuit 280, and demodulates the signal modulated by the modulator 187 and applies the demodulated signal to the error correction circuit 220. The error correction circuit 220 corrects any error occurring mainly in the channel in accordance with the error correction code added by the error correction code adder 186 (FIG. 3). The signal the error of which has been corrected is applied to the program dividing circuit 230. The program dividing circuit 230 selects and outputs a desired program in accordance with the control signal from the control circuit 280 from a plurality of programs time-division multiplexed by the time-division multiplexer 185 on a single transmission channel.

The output signal of the program dividing circuit 230 is applied to the change-over circuit 240 and the interface circuit 290, and further through the terminal 203 to the VTR 53. The VTR 53 records the digital bit stream applied thereto, and, at playback, applies a signal to the interface circuit 290 through the terminal 203 in the same format as the input bit stream. The output signal of the interface circuit 290 is applied to the change-over circuit 240. The change-over circuit 240 selects and outputs a signal from the program dividing circuit 230 when restoring the received signal and selects and outputs a signal from the interface circuit 290 when selecting and outputting a reproduced output signal of the VTR 53, in accordance with the control signal from the control circuit 280.

The output signal of the change-over circuit 240 is applied to the decryption circuit 250. The decryption circuit 250 decrypts the signal encrypted by the encrypters 181 to 184 (FIG. 3). The signal decoded from the code produced by the decryption circuit 250 is applied to the decoding circuit 260, where the bits compressed at the bit compressors 160 to 163 are decoded and decompressed.

The bit-decompressed signal from the decoding circuit 260 is applied to the output processing circuit 270 as a component signal containing a luminance signal and two color difference signals. The two color difference signals applied to the output processing circuit 270 are subjected to quadrature modulation and thus converted into a carrier chrominance signal, so that the output processing circuit 270 produces the resulting carrier chrominance signal and the luminance signal. The output signal is applied through the terminal 202 to the TV receiver 54. Just in case the TV receiver 54 has only a composite input terminal, the output processing circuit 270 may produce a composite signal by adding the luminance signal and the carrier chrominance signal. Further, both a signal containing the luminance signal and the carrier chrominance signal and a composite signal may be produced.

Also, the signal applied from the receiver 56 through the input terminal 205 is recorded in the VTR 53 as required, and a reproduced signal is applied to a TV image pick-up device 54. When the signal from the receiver 56 is not recorded in the VTR 53, on the other hand, the input signal or an equivalent signal is applied to the TV receiver 54. In the embodiment shown in FIG. 4, the signal not yet decrypted is recorded in the VTR 53, and therefore the signal is not necessarily decrypted at the time of recording in the VTR 53. The subscriber can thus record free of charge and can be charged doe each playback.

Figure 5:
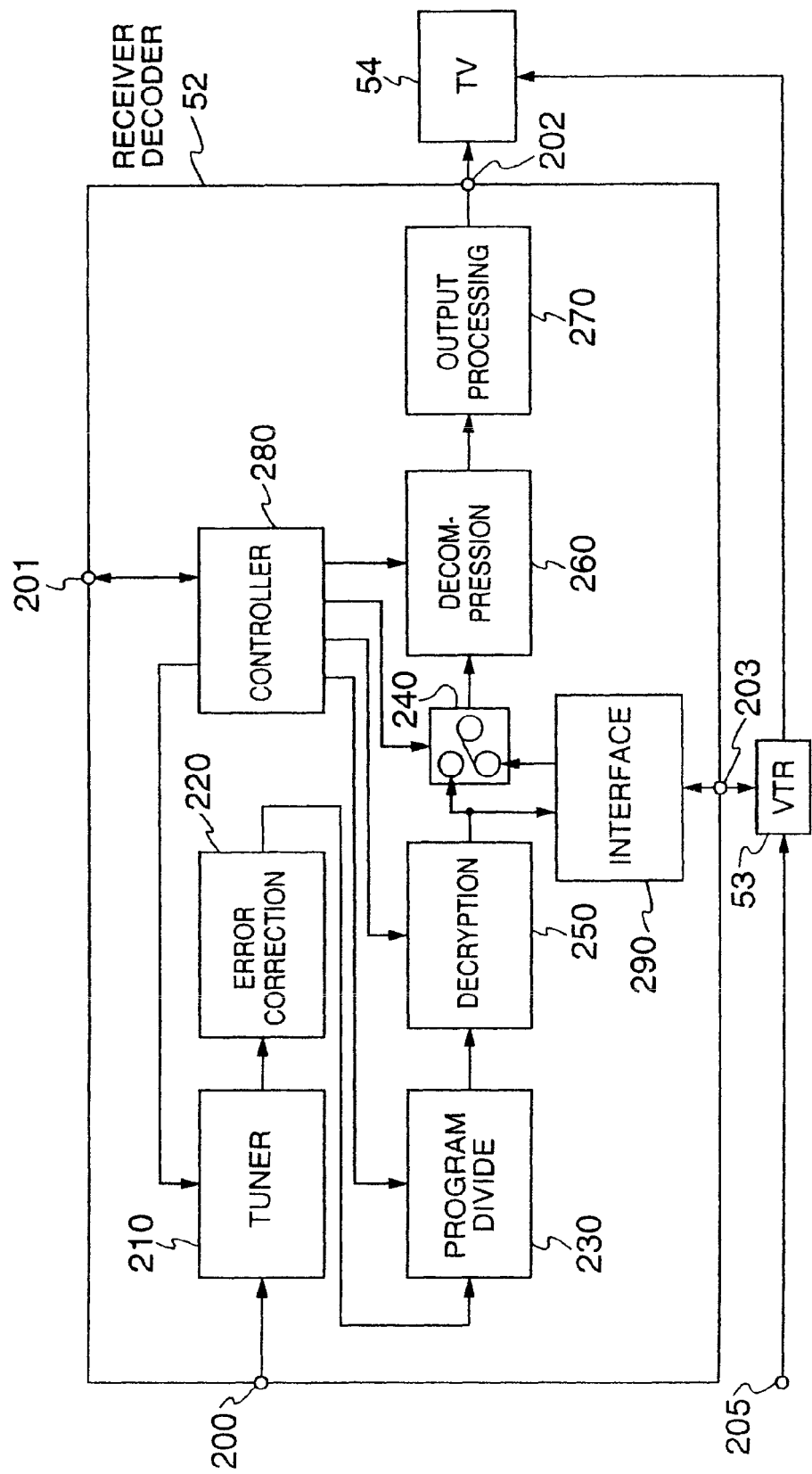
FIG. 5 is a block diagram showing a receiver decoder according to an embodiment of the invention.

FIG. 5 shows another specific example of the receiver decoder shown in FIG. 1 according to an embodiment. The component parts included in FIG. 5, which are partially shared by the embodiment of FIG. 4, are designated by the same reference numerals as the corresponding parts respectively and will not be described in detail.

According to the embodiment shown in FIG. 5, the change-over circuit 240 is located behind the decryption circuit 250 as compared with the embodiment shown in FIG. 4. Specifically, the output signal of the decryption circuit 250 is applied to the VTR 53 and the change-Over circuit 240, and the output signal of the VTR 53 to the change-over circuit 240. The output signal of the change-over circuit 240 is applied to the decoding circuit 260.

The embodiment shown in FIG. 5 concerns the case of recording a signal decrypted at the decryption circuit 250. In this case, the decrypted signal is recorded in the VTR 53. Therefore, the subscriber is charged for decryption at recording, and can playback without being charged.

Although the decryption circuit 250 is arranged behind the program dividing circuit 230 in the embodiment shown in FIG. 5, the program dividing operation may be performed after decryption.

Figure 6:
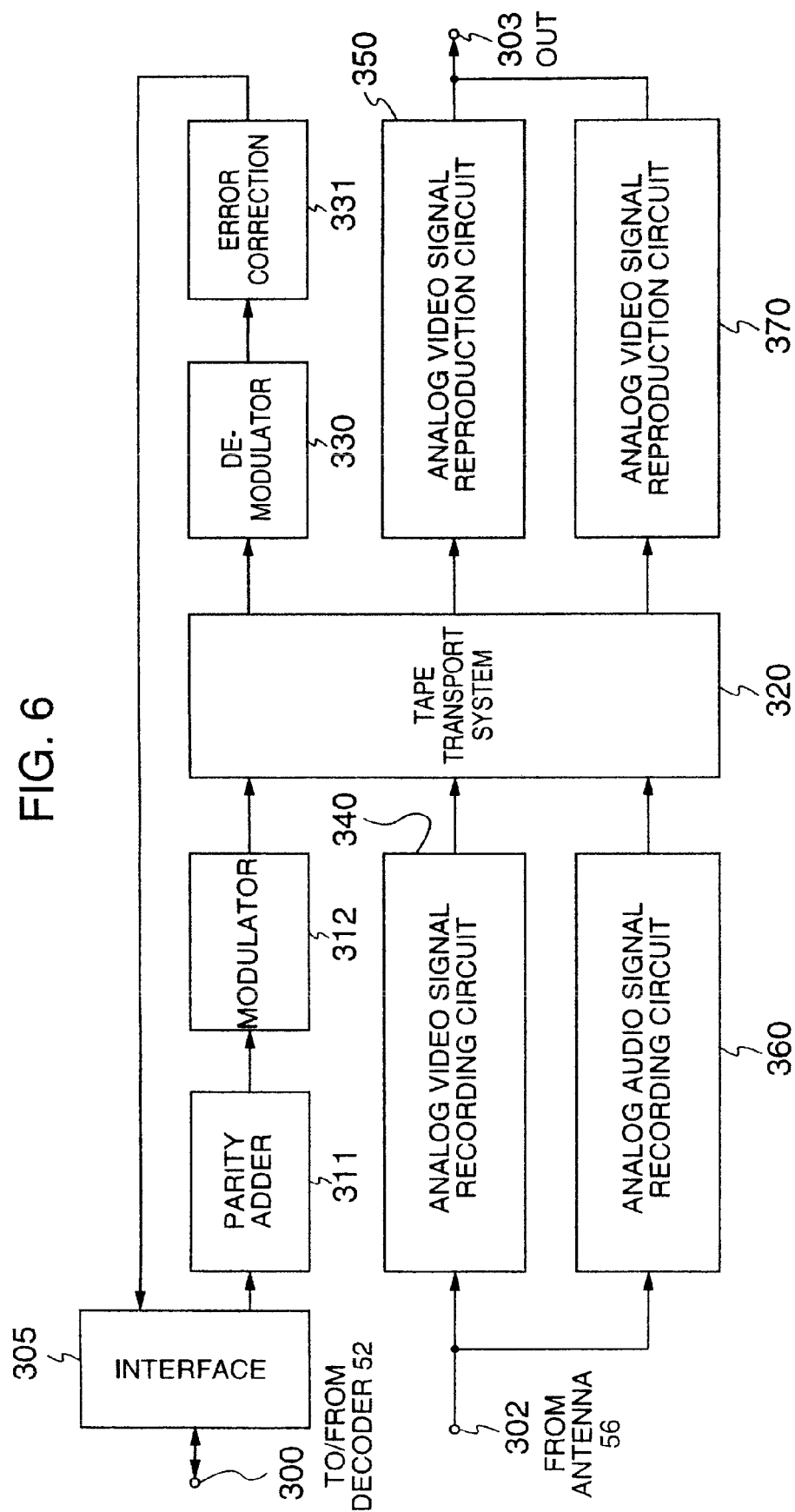
FIG. 6 is a block diagram showing a VTR according to an embodiment of the invention.

FIG. 6 is a block diagram showing a VTR 53 according to one embodiment of the invention. In FIG. 6, numeral 300 designates an input-output terminal for a signal from the receiver decoder 52 shown in FIG. 1, numeral 302 an input terminal for a signal from the receiver 56 shown in FIG. 1, numeral 303 an output terminal thereof, numeral 305 an interface circuit, numeral 311 a parity adder circuit, numeral 312 a modulation circuit, numeral 320 a tape transport system, numeral 330 a demodulation circuit, numeral 331 an error correction circuit, numeral 340 an analog video signal recording circuit, numeral 350 an analog video signal reproduction circuit, numeral 360 an analog audio signal recording circuit, and numeral 370 an analog audio signal reproduction circuit.

The signal applied through the input terminal 300 is applied to the parity adder circuit 311 through the interface circuit 305. The parity adder circuit 311 is for adding a parity code for correcting any error which may occur in the tape transport system 320. The output signal from the parity adder circuit 311 is applied to the modulation circuit 312. The modulation circuit 312 modulates the digital signal into a form suitable for the tape transport system 320. Such schemes as NRZ, NRZI, 8-10 conversion, MFM, M2, etc. are known for modulation. The modulated signal is applied to the tape transport system 320 and recorded in the magnetic tape 1.

At playback, the reproduced signal is applied to the demodulation circuit 330 where it is modulated in correspondence with the modulation circuit 312. The output signal of the demodulation circuit 330 is applied to the error correction circuit 331, where any error which may have occurred in the tape transport system 320 is corrected on the basis of the parity code added at the parity adder circuit 311. The output signal of the error correction circuit 331 is applied to the interface circuit 305, and after being converted into a signal in the same form as the signal input from the input terminal 300, is output from the terminal 300. The signal output from the terminal 300 is applied to the receiver decoder 52 shown in FIG. 1.

As seen from the embodiment of FIG. 6, the VTR 53 requires therein none of the bit compressors 170 to 173 shown in FIG. 2, and therefore a digital signal VTR which is small in circuit size can be realized. Also, no bit compressor is required in any VTR, but only at the program distribution center 30. Therefore, although the center increases in circuit size and cost, a high-performance bit compressor can be used, and the resulting higher relative bit compression ratio reduces the data rate of the digital signal transmitted. Consequently, the VTR 53 used by the subscriber can be improved in quality, reduced in cost and can record for a longer time.

An analog signal is applied through the terminal 302 from the receiver 56 to the analog video signal recording circuit 340 and the analog audio signal recording circuit 360; where the signal is processed according to the VHS standard, β standard or the 8-mm VTR standard, for example. The signal thus processed is applied to the tape transport system 320. The tape transport system 320 records the signal in accordance with respective formats as in a conventional VTR.

At playback, the signal reproduced at the tape transport system 320 is applied to the analog video signal reproduction circuit 350 and the analog audio signal reproduction circuit 370 which process the reproduced signal in a manner corresponding to the analog video signal recording circuit 340 and the analog audio signal recording circuit 360, respectively. The reproduced signal is applied appropriately to the TV receiver 54 shown in FIG. 1 through the output terminal 303. As a result, the digital broadcast and the conventional analog broadcast can be recorded using the same tape transport system.

FIG. 7 is a model diagram showing an example signal (or an output signal from the output terminal 31a shown in FIG. 3) output from the transmitter 31. The embodiment of FIG. 7 shows the case in which four programs are transmitted through a single transmission channel according to the embodiment shown in FIG. 2. Also, the embodiment concerns the case in which there are a number n of transmission channels (1) to (n). In FIG. 7, V1, V2, V3 and V4 designate video signals of four programs, A1, A2, A3, A4 audio signals for four programs, PG designates a signal representing program guide information, and VECM, AECM represent control signals representing the viewing rights. Each of these signals is a signal constituting a packet.

In the embodiment shown in FIG. 2, the four programs generally have different transmission rates. From the immediate point of view, the data amount is increased or decreased. In order to efficiently control this variation, each information bit is packeted and time-division multiplexed as shown in FIG. 7. Details of the signal in the packet are described in the transmission standards referred to above. Though not shown in detail in the model diagram of FIG. 7, the signal in each packet is encrypted by the encrypters 181 to 184 as required as explained with reference to FIG. 3. Also, the error correction code adder 186 adds an error correction code and the time-division multiplexer 185 header information such as a synchronization signal.

Figure 8:
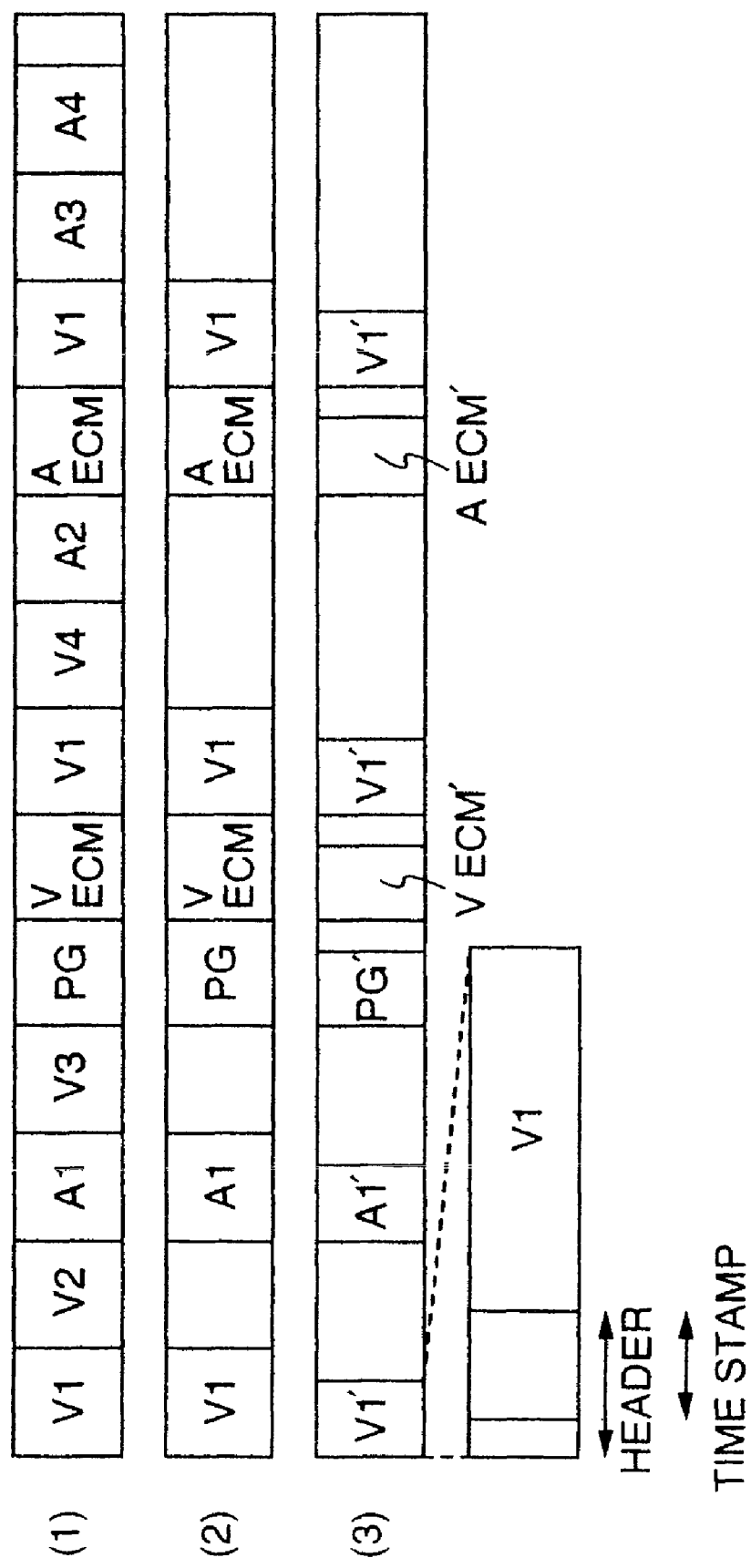
FIG. 8 shows signal waveforms according to the invention.

In-the embodiments shown in FIGS. 4 and 5, signals designated by (1) to (n) in FIG. 7 are supplied through the terminal 200, and a signal for one of the transmission channels is selected at the tuner 210. In the case under consideration, the signal of FIG. 7(1) is assumed to have been selected. The selected signal shown in FIG. 7(1) has an error thereof corrected at the error correction circuit 220 and is applied to the program dividing circuit 230. The program indicated by the suffix 1 is assumed to have been selected from the time-division multiplexed four programs at the program dividing circuit 230. In such a case, the program guide information PG, the viewing right control signals VECM, AECM are also separated and output at the same time as the video signal V1 and the audio signal AI. FIG. 8(2) shows the signal representing a divided program. FIG. 8(1) is identical to FIG. 7(1).

With reference to the embodiments shown in FIGS. 4 and 5, explanation will first be made about the case in which not the reproduced signal from the VTR 53 but rather the signal from the tuner 210 is selected directly by the change-over circuit 240. The signal~about divided into a program shown in FIG. 8(2) is decrypted by the decryption circuit 250. This decryption is performed according to the viewing right control signals VECM, AECM shown in FIG. 8(2). More specifically, when a subscriber household has the right to view the program presently selected, the code is decrypted, while when the subscriber household has no right to view the program, the code is not decrypted. Instead, the absence of the viewing right is indicated or information indicating a method for acquiring the viewing right is output from the terminal 202. The output of this information is what is called the on-screen-display (OSD). This information is added to the video signal and output from the output processing circuit 270.

The decrypted signal is applied to the decoding circuit 260. The decoding circuit 260 corresponds to the bit compressors 170 to 173 shown in FIG. 2, and decodes a signal input according to the MPEG-2 standard, for example. When a signal compressed according to the MPEG standard is decoded, it is necessary to synchronize the transmitted signal with the data to be decoded. When the transmitted signal fails to be synchronized with the data to be decoded and the decoding rate is higher than the transmission rate, for example, the data runs short making the decoding impossible. In order to prevent such an inconvenience, a clock reference called SCR (System Clock Reference) or PCR (Program Clock Reference) is added to the packet according to the MPEG standard. At decoding, the decoding clock signal is restored according to this clock reference. This is described, for example, in MPEG-2 System Working Draft (ISO/IEC/JTC1/SC291WG11 No. 601 MPEG92/November, 1993), pp. 20-25. As a result, the arrival time of each packet cannot be changed.

For the selected signal of FIG. 8(2) to be recorded in the VTR 53, therefore, it is necessary to conceive a method for making reproduction while maintaining time intervals of input packets.

A signal corresponding to FIG. 8(2) is applied as an input signal to the interface circuit 290. As an example, the bit rate of the signal output from the transmitter 31 shown in FIG. 2 is assumed to be 40 Mb/s. Among these bits, assume that the information in the amount 7/6 of the Viterbi code is assigned for error correction and that the header information of 17 bytes is added for 130 bytes of packets compressed by the bit compressor. Under the condition where an error is corrected by the error correction circuit 220 shown in FIGS. 5 and 6 and the header information required for transmission is removed, the bit rate is about 30 Mb/s as expressed by the following Equation (1):

$$40 \times (6/7) \times (139/147) = 30.39 \quad (1)$$

As shown in FIG. 8(2), packets exist successively at some parts and with intervals of several packets at other parts. For the VTR 53 to record while maintaining these time intervals of signals, recording at higher rate than shown in Equation 1 is required. As shown in FIG. 8(2), packets are not sent for some time intervals. As far as packets can be packed for recording and restored to the original time intervals at the time of reproduction, therefore, the recording rate can be reduced as compared with the value shown in Equation 1. FIG. 8(3) shows signals applied to the VTR 53 from the interface circuit 290 in FIGS. 5 and 6 for recording the packets in packed state at the time of recording and restoring the packet intervals to the original time intervals at the time of reproduction.

FIG. 8(3) shows signals applied to the interface circuit 290 from the program dividing circuit 230 in the embodiment shown in FIG. 5 and from the decryption circuit 250 in the embodiment shown in FIG. 6. The interface circuit 290 adds information (time stamp) indicating the time of packet arrival as header information to the input signal. Information other than the time stamp may be further added as header information. Also, it is necessary to increase the packet transmission rate in order to add the header information such as a time stamp to the input signal to the interface circuit 290 shown in FIG. 8(2). FIG. 8(3) shows a model of such a case. More specifically, a packet is transmitted for a shorter transmission time in FIG. 8(3) than in FIG. 8(2).

Figure 9:
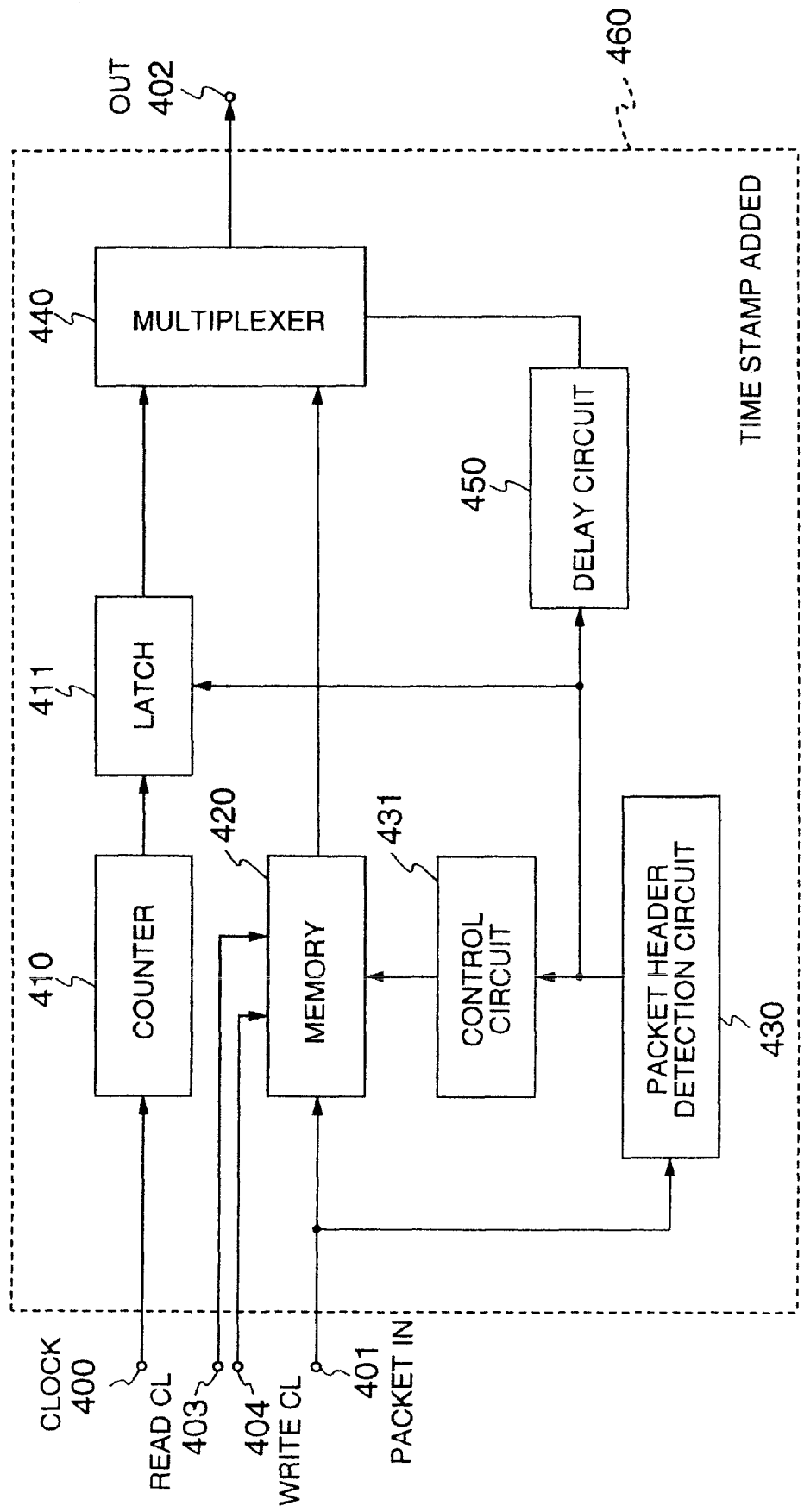
FIG. 9 is a block diagram showing a time stamp adder circuit according to an embodiment of the invention.

FIG. 9 shows a circuit for adding a time stamp according to an embodiment. Numeral 400 designates an input terminal for a clock signal to count the time stamp, numeral 401 an input terminal for a packet signal shown in FIG. 8(2), numeral 402 an output terminal for a signal to which a time stamp is added, numeral 410 a counting circuit, numeral 411 a latch circuit, numeral 420 a memory, numeral 430 a packet head detection circuit, numeral 431 a memory control circuit, numeral 440 a multiplexing circuit, and numeral 450 a delay circuit.

The packet signal shown in FIG. 8(2) is applied through the terminal 401 to the memory 420 and 10 the packet head detection circuit 430. The packet head detection circuit 430 detects the head of the packet of the signal input, and the resulting detection signal is applied to the latch circuit 411, the control circuit 431 and the delay circuit 450. The clock signal supplied from the terminal 400, on the other hand, is applied to the counting circuit 410 to thereby count the clock signals continuously. The output signal from the counting circuit is applied to the latch circuit 411. The latch circuit 411 latches the count input by the packet head signal from the packet head detection circuit 430. The count thus latched is applied to the multiplexing circuit 440. This count provides time stamp information for a packet.

A control signal for the memory 40 is generated on the basis of the packet head detection signal applied to the control circuit 431. The clock signal applied from the terminal 404 is used as a write clock for the memory 420 since the clock signal coincides with the packet signal frequency applied from the terminal 401. The clock signal applied from the terminal 403 is used as a read clock for the memory 420. A frequency higher than that of the write clock applied from the terminal 404 is selected as a frequency of this clock signal. When the write clock frequency is 30.3 MHz according to Equation 1, for example, the read clock frequency is set to 49.152 MHz. This read clock constitutes a bus clock frequency of the signal sent to the VTR 53 from the terminal 203 shown in FIGS. 5 and 6. In the process, the clock signal for the counting circuit 410 applied from the terminal 400, i.e., the clock signal frequency for the time stamp is the same as the clock signal frequency applied from the terminal 403, for example. In this case, the same signal can be used for the bus clock signal applied from the terminal 403 as the clock signal for the time stamp. This is, however, not to limit the time stamp clock frequency to the same frequency as the bus clock frequency.

A predetermined length of time after a packet is applied to the memory 420, the packet is read from the memory. The frequency of the read clock signal is set higher than the write clock signal frequency. Therefore, the transmission time of the output packet can be reduced as compared with the transmission time of the input packet signal as shown in FIGS. 8(2) and 8(3). As a result, even where a succession of packets are transmitted, as shown in FIG. 8(3), a period of time is available for adding the header information including the time stamp. The output signal of the memory 420 is applied to the multiplexing circuit 440.

The delay circuit 450 delays the packet head detection signal and outputs a gate signal indicating the position of addition of the time stamp signal in accordance with the packet signal output from the memory 420. The particular gate signal is applied to the multiplexing circuit 440, where the time stamp from the latch circuit 411 is added and the signal shown in FIG. 8(3) is output from the terminal 402 in accordance with the gate signal.

Figure 10:
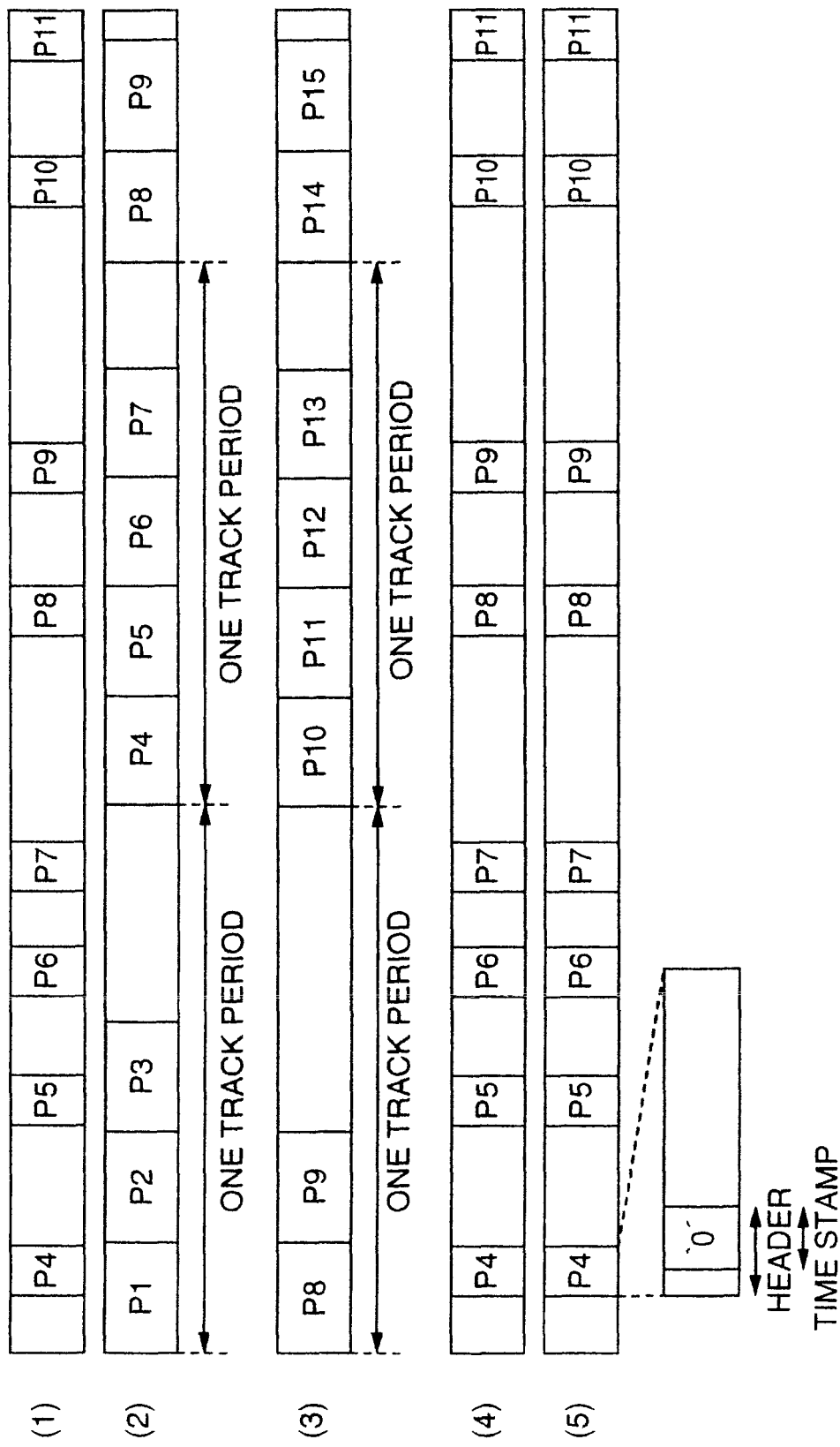
FIG. 10 shows signal waveforms according to the invention.

The signal shown in FIG. 8(3) is applied through the terminal 203 shown in FIGS. 5 and 6 to the VTR 53. FIG. 10(1) shows signals corresponding to FIG. 8(3), and characters P1, P2, . . . designate input packet signals. In the VTR 53, as shown in FIG. 7, the packet signals P4, P5, . . . shown in FIG. 10(1) are applied to the parity adder circuit 311 through the terminal 300 and the interface circuit 305. The parity adder circuit 311 includes a memory (not shown) of a capacity for storing at least as many signals as to be recorded in a single track, which memory stores the packet signals P4, P5, . . . . The parity adder circuit 311 outputs packet signals in a packed state as shown in FIG. 10(2). There are gaps formed between the packets of the input signal shown in FIG. 10(1) as explained with reference to FIG. 8. Since the packet signals are output with the gaps thereof closed, as shown in FIG. 10(2), however, the rate of the output signal is lower than that of the input packet signals. The recording rate for the tape transport system 320 can thus be reduced. In FIG. 10, the output signal (2) is shown as being delayed behind the input signal (1) by a track of period for the sake of simplicity. However, the delay is not limited to a track of period but may be as required for the signal processing.

At the time of reproduction, the signal reproduced and output from the tape transport system 320 is applied through the demodulation circuit 330 to the error correction circuit 331. The signal applied to the error correction circuit 331 is, as in the case of FIG. 10(2), composed of packet signals P1, P2, . . . in a packed state. FIG. 10(3) shows a reproduced input signal for the error correction circuit. The error correction circuit 331 also has a memory (not shown) of a capacity corresponding to the signal for one track period. The input signal shown in FIG. 10(3) is applied to the memory in the error correction circuit 331. FIG. ii is a block diagram showing an embodiment of a temporal adjusting circuit for restoring the intervals of the reproduced packet signals P1, P2, to the original length. FIG. 10(4) shows the reproduced packet signals P1, P2, . . . whose intervals are restored to the original length.

Figure 11:
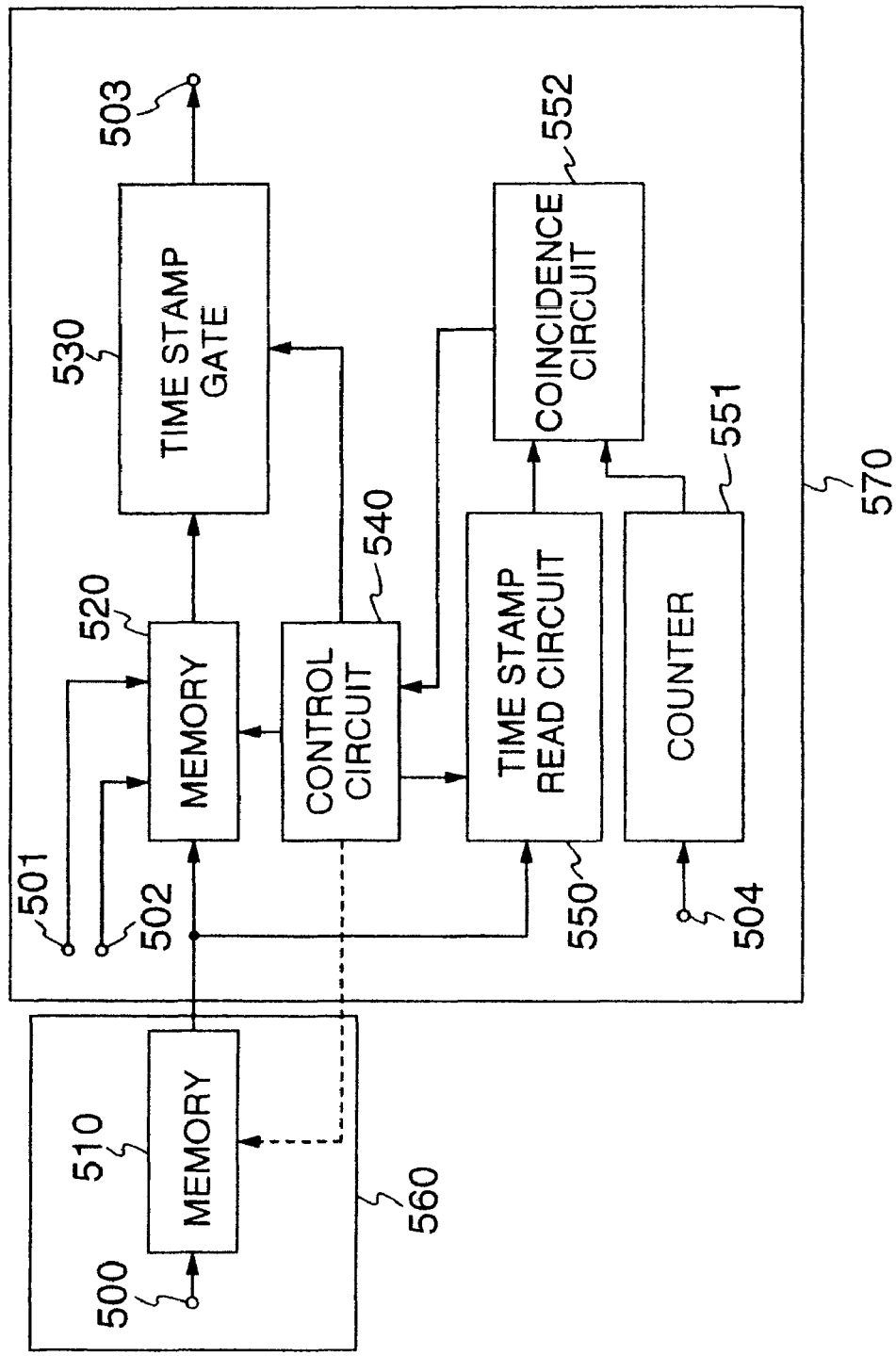
FIG. 11 is a block diagram showing a temporal adjusting circuit according to an embodiment of the invention.

In FIG. 11, numeral 510 designates a memory in the error correction circuit 331, numeral 500 an input terminal for the memory 510, numeral 520 a memory, numeral 501 a read clock input terminal for the memory 520, numeral 502 a write clock input terminal for the memory 520, numeral 503 an output terminal for the signal which is temporally adjusted, numeral 551 a counting circuit, numeral 504 an input terminal for the clock signal for the counting circuit 551, numeral 530 a time stamp gate circuit, numeral 540 a control circuit, numeral 550 a time stamp read circuit, numeral 552 a coincidence detection circuit, numeral 560 a circuit block built in the error correction circuit 331, and numeral 570 a circuit block built in the interface circuit 305.

The reproduced signal shown in FIG. 10(3) applied from the terminal 500 shown in FIG. 11 is applied to the memory 510. The signal output for each of the packets represented by the packet signals P1, P2, . . . from the memory 510 is applied to the memory 520 and the time stamp read circuit 550. The read operation of the memory 510 and the write and read operation of the memory 520 are controlled by the control signal from the control circuit 540. The time stamp read circuit 550 is also supplied with the control signal from the control circuit 540 and outputs a signal indicating the position of the time stamp signal with respect to the signal from the memory 510, thereby reading the time stamp signal at the correct position. The time stamp signal thus read is applied to the coincidence detection circuit 552.

A clock signal of the same frequency as that input from the terminal 400 shown in FIG. 9 is applied from the terminal 504 to the counting circuit 551. The counting circuit 551 counts the clock signal thus input and outputs the count to the coincidence detection circuit 552. The coincidence detection circuit 552 outputs a coincidence signal when the two input signals coincide with each other, which coincidence signal is applied to the control circuit 540.

The control circuit 540 causes a packet signal to be read from the memory 520 in accordance with the coincidence signal. FIG. 10(4) shows a signal thus read out. The read operation is performed in accordance with the read clock signal applied from the read terminal 501. At the same time, a new packet is applied from the memory 510, and is written in the memory 520 on the basis of the write clock applied from the terminal 502. The clock signal frequency applied from the terminal 501 is determined in such a manner as to correspond to the signal rate between the terminal 203 and the VTR 53 shown in FIGS. 5 and 6.

The packet signals P1, P2, . . . . Temporally adjusted and output from the memory 520 are applied to a time stamp gate circuit 530. The time stamp gate circuit 530 gates the time stamp signal as required, so that all the time stamp signals are fixed to 0 or 1 level, for example. As shown in FIG. 10(5), the signal rearranged to the same time intervals as the signal shown in FIG. 10(1) from the terminal 300 shown in FIG. 7 is output from the terminal 503.

As a result of the above-mentioned operation, signals of the same packet intervals as the one shown in FIG. 8(3) are applied from the terminal 203 shown in FIGS. 5 and 6 to the interface circuit 290. The interface circuit 290 deletes the header information as required and applies the resulting signal to the switch circuit 240. Hence, the same signal as the one from the tuner 210 applied from the other input terminal of the switch 240 is restored.

A VTR for recording digital signals has a feature that the image quality is not deteriorated after repetitive dubbing due to the sufficient error correction effected as shown in FIG. 7. Nevertheless, repeated dubbing without a deterioration of image quality may fail to protect the rights of copyright holders sufficiently. In order to avoid this inconvenience, there is provided a technique for preventing dubbing according to the invention.

As shown in FIG. 11, the temporally adjusted packet signals P1, P2, . . . output from the memory 520 are applied to the time stamp gate circuit 530. The time stamp gate circuit 530 sets all the signals for the period corresponding to the time stamp shown in FIG. 8(3) to, say, 0 level or 1 level, as described above. As a result, the information indicating the time intervals of the packets disappears from the packet signals P1, P2, . . . output from the interface circuit 305 shown in FIG. 7. When the output signal from the terminal 300 is applied to and recorded in the VTR shown in FIG. 7, therefore, the signal shown in FIG. 10(3) is reproduced. Since the signal indicating the time stamp position included in each packet which may be read contains no information indicating the time intervals, the original time intervals cannot be restored. When all of the signals at the position corresponding to the time stamp are at 0 or 1 level, the circuit shown in FIG. 11, after reading a packet, reads the next packet after the lapse of a time corresponding to the number of bits of the time stamp. Generally, the number of bits of a time stamp is set in such a manner that the period indicated by the particular number of bits is longer than one track period. The signal of the next track, therefore, is written in the memory 510 before all the packet signals are read from the memory 510. As a result, it is no longer possible to output signals corresponding to input signals. Thus the dubbing can be inhibited.

The foregoing description concerns the case in which all the signals at the position corresponding to the time stamp are set to 0 or 1 level. Alternatively, the same effect can be attained in the time stamp gate circuit 530 by changing at least a bit of the signal at the position of the time stamp. As a result, when the reproduced signal is recorded in another VTR, it is no longer possible to restore the packets to the original position. The dubbing can thus be inhibited.

Now, a technique will be described for restoring, with high accuracy, the signal reproduced as mentioned above. The MPEG standard stipulates that the accuracy of the system clock for decompressing and restoring a compressed image should be set to 27 MHz 30 ppm or less. In order to achieve this accuracy, as described above, the system clock is restored using the clock reference SCR. In the case of digital broadcast, the accuracy of the clock at the program distribution center 30 shown in FIG. 1 is defined as 3 ppm or less. When the signal received at the receiver 51 and the receiver decoder 52 is restored directly by the decoding circuit 260 without the VTR 53, the restoration of the system clock using the clock reference SCR described above can achieve substantially the same accuracy of the system clock as that for the program distribution center 30.

Figure 12:
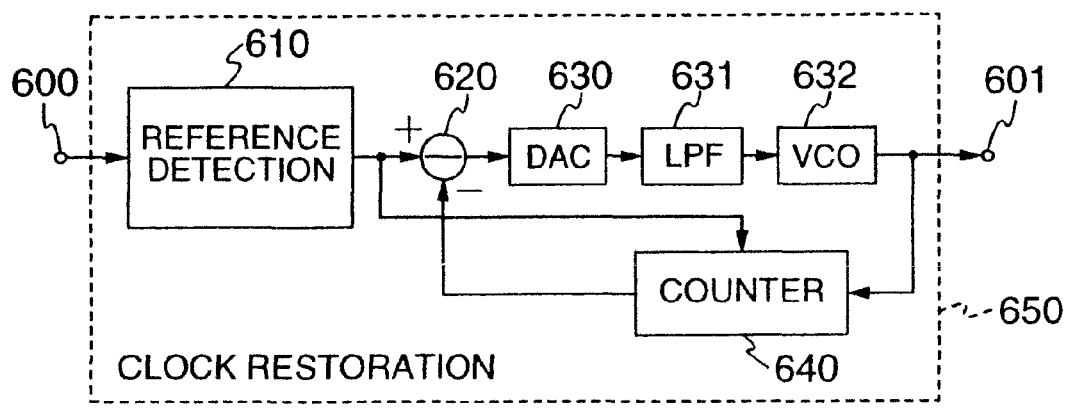
FIG. 12 is a block diagram showing a clock restoration circuit according to an embodiment of the invention.

FIG. 12 shows a block diagram of a circuit for restoring the system clock on the basis of the clock reference SCR. In FIG. 12, numeral 600 designates an input terminal for a signal received, numeral 601 an output terminal for a system clock, numeral 610 a circuit for detecting the clock reference SCR, numeral 620 a subtractor circuit, numeral 630 a D/A converter circuit, numeral 631 a low-pass filter (hereinafter referred to as the LPF), numeral 632 a voltage-controlled oscillator (hereinafter referred to as the VCO), and numeral 640 a counter circuit.

The receive signal applied from the terminal 600 is the one after error correction at the error correction circuit shown in FIGS. 4 and 5 and before the decoding at the decoding circuit 260. The signal thus input corresponds to (1) or (2). Upon application thereto of a signal before program division at the program dividing circuit 230, the clock reference detection circuit 610 performs the same operation as the program dividing circuit 230 and detects and outputs the clock reference SCR contained in a predetermined packet. The detected clock reference SCR is applied to the subtractor circuit 620 and the counter circuit 640. The counter circuit 640 sets the value of the reference SCR as the initial value on the counter. The system clock output from the terminal 601 is applied to the counter circuit 640 which counts the system clock from the value set by the clock reference SCR. The count on the counter is applied to the subtractor circuit 620, which outputs the difference between the reference SCR and the count with the reference input and applies the difference to the D/A converter circuit 630. The D/A converter circuit 630 converts the input difference into an analog signal, which is applied to the LPF 631. The LPF 631 smoothes the input analog signal and applies the smoothed signal to the VCO 632. The VCO 632 controls the oscillation frequency according to the input signal. The output signal of the VCO 632 is output as a system clock from the terminal 601.

The circuit shown in FIG. 12 constitutes what is called a negative feedback circuit. When the system clock frequency is high as compared with the intervals of the clock reference SCR, a negative value is output from the subtractor circuit

620, whereas when the system clock frequency is lower, a positive value is produced from the subtractor circuit 620, thereby controlling the oscillation frequency of the VCO 632 to a constant level. Consequently, the system clock frequency at the receiver side, i.e., the receiver decoder can be made equal to the system clock frequency at the transmission side, i.e., the program distribution center 30, so that the accuracy of the system clock can be maintained substantially less than ±3 ppm.

Now, a technique is described for restoring with high accuracy the signal reproduced from the VTR 53. In this case, the accuracy of the clock at the program distribution center 30, the accuracy of the time stamp at the time stamp adder circuit shown in FIG. 9, and the accuracy of the clock of the temporal adjusting circuit shown in FIG. 11 are determinant factors. When a clock signal is produced independently for each of these circuits, the overall accuracy must be maintained at 30 ppm or less. The clock accuracy at the program distribution center 30 is ±3 ppm. Therefore, the accuracy of the tithe stamp at the time stamp adder circuit shown in FIG. 9 and the accuracy of the clock for the temporal adjusting circuit shown in FIG. ii are required to be maintained to ±13 ppm or less respectively. In order to maintain this accuracy, a high-accuracy crystal oscillator is required.

Figure 13:
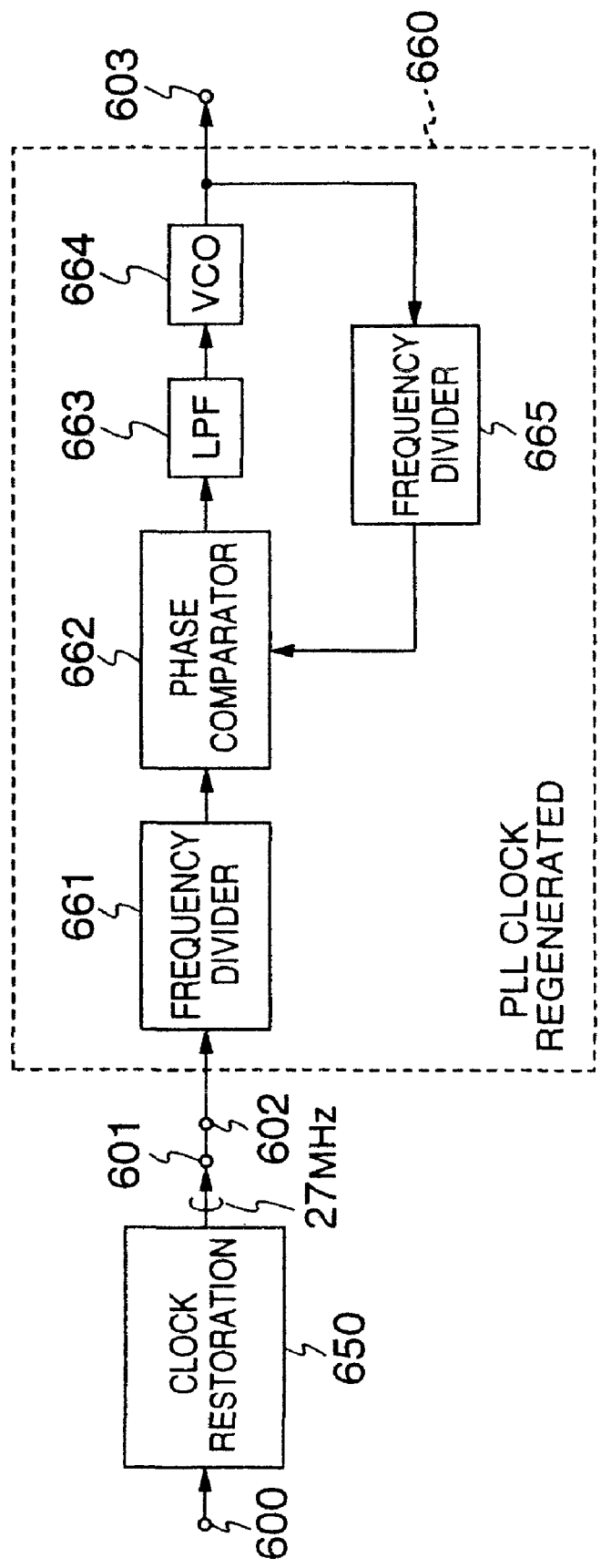
FIG. 13 is a block diagram showing a clock generating circuit for the time stamp according to the invention.

A technique for improving the accuracy of the time stamp at the time stamp adder circuit shown in FIG. 9 is illustrated in FIG. 13. In FIG. 13, numeral 650 designates a clock restoration circuit shown in FIG. 12, numeral 600 a PLL circuit, numeral 602 a system clock input terminal, numeral 603 a clock signal output terminal, numerals 661, 665 frequency divider circuits, numeral 662 a phase comparator circuit, numeral 663 an LPF, and numeral 664 a VCO.

The system clock signal output from the terminal 601 is applied through the terminal 602 to the PLL circuit 660. The system clock signal applied from the terminal 602 is frequency-divided to a predetermined frequency at the frequency-divider circuit 661. The signal thus frequency-divided is applied to the phase comparator circuit 662, and the oscillation frequency of the VCO 664 is frequency-divided at the frequency divider circuit 665 to a frequency equal to the output signal frequency of the frequency divider circuit 661. The phase comparator circuit 661 compares the phases of the two input signals, and applies a phase error signal therebetween to the LPF 663. The output signal of the LPF 663 is applied to the VCO 664 for controlling the oscillation frequency of the VCO 664. This PLL circuit 660 constitutes what is called a negative feedback circuit. When the oscillation frequency of the VCO 664 is higher than the system clock input from the terminal 602, the input to the PLL circuit 660 is fed back in such a manner as to reduce the oscillation frequency, and vice versa. Consequently, the oscillation frequency of the VCO 664 is phase-locked to the system frequency. The accuracy of the clock signal frequency output from the terminal 603 thus can be maintained at ±3 ppm or less which is substantially equal to the accuracy of the system clock signal input.

The accuracy of the time stamp can thus be set to that of the clock at the program distribution center 30. In view of the accuracy value of ±3 ppm, the clock accuracy of the temporal adjusting circuit is set to ±27 ppm or less. An error twice as large as when using an independent clock is permitted, thereby facilitating the designing of the oscillator.

The clock restoration circuit 650 is required in the decoding circuit 260, and therefore can double as a clock restoration circuit included in the decoding circuit 260. A clock restoration circuit may alternatively be provided independently for adding a time stamp signal.

In the embodiment shown in FIG. 13, assume that the system clock frequency is 27 MHz and the time stamp frequency is 49.152 MHz. The dividing ratio of the frequency divider circuit 661 is set to $1/1125$, and the dividing ratio of the frequency divider circuit 665 to $1/2048$. In this case, the frequencies of the signals applied to the phase comparator 662 are both set to 24 kHz.

When the time stamp frequency assumes a value different from the aforementioned frequency, the dividing ratio of the frequency divider circuits 661, 665 is changed appropriately to meet the situation. Also, in the case where the time stamp frequency is set to 27 MHz, the PLL circuit 660 of course is not required, and the system clock signal output from the terminal 601 is used as a clock signal for the time stamp.

In FIG. 9, assume that the time stamp frequency and the bus clock frequency are both set to 10 49.152 MHz. The clock signal of 49.152 MHz generated in the embodiment of FIG. 13 is applied from the terminals 400, 403, whereby the frequency accuracy of the time stamp can be maintained at 3 ppm or less, a value equal to the system clock accuracy of the program distribution center 30.

Figure 14:
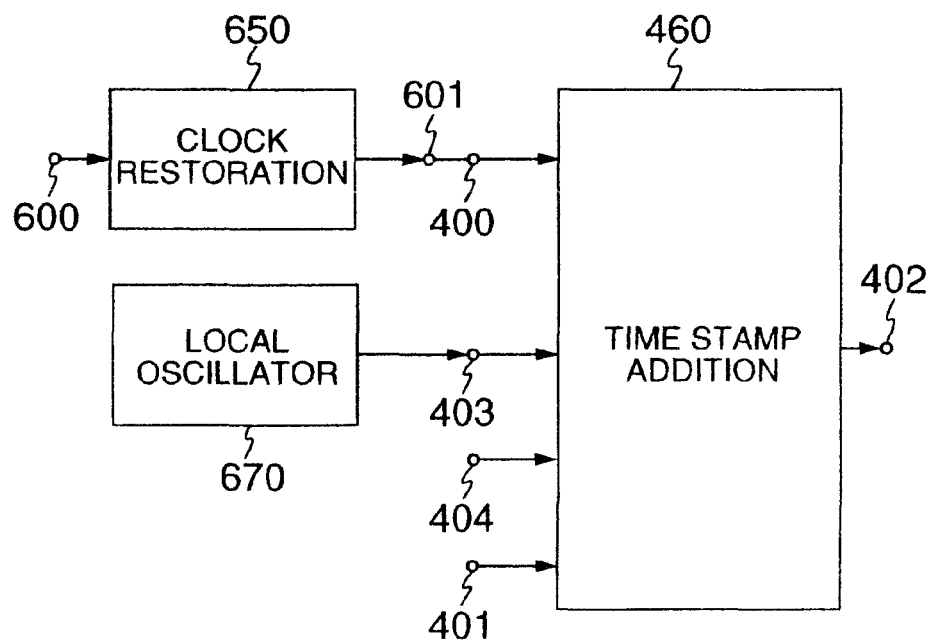
FIG. 14 is a block diagram showing a time stamp adding scheme according to the invention.

When the time stamp frequency is set to 27 MHz and the bus clock frequency to 49.152 MHz, on the other hand, the PLL circuit 660 is not required. The system clock signal output from the terminal 601, therefore, is applied as a time stamp clock signal from the terminal 400, while the bus clock frequency has an accuracy of only about ±100 ppm. A local oscillator can thus be used. FIG. 14 shows the configuration of a time stamp adder circuit in such a case. In this circuit, numeral 670 designates a local oscillator adapted to oscillate at 49.152 MHz described above.

Now, description is made about the accuracy of the clock signal for the temporal adjusting circuit shown in FIG. 11 when a time stamp signal is prepared as shown in FIG. 13. When the time stamp clock signal applied from the terminal 504 and the bus clock frequency applied from the terminal 501 are equal to each other at, say, 49.152 MHz, for example, a clock signal is applied for both from a local oscillator of the same frequency of 49.152 MHz. The accuracy of the clock frequency in this case is required to be ±27 ppm or less as described above.

When the bus clock frequency and the time stamp signal frequency are different from each other, on the other hand, the accuracy of the time stamp signal applied from the terminal 504 is required to be ±27 ppm or less, while the required accuracy of the bus clock signal applied from the terminal 502 is only about ±100 ppm. In this case, both clock signals can be produced by a local oscillator. This corresponds to setting the time stamp signal frequency to 27 MHz and the bus clock frequency to 49.152 MHz in the above-mentioned case.

Further, a technique is described for operating the VTR 53 in stable fashion. For the VTR 53 to operate stably, the relation between the rate of data input from the terminal 300 shown in FIG. 6 (corresponding to the time stamp frequency) and the rotational speed of the rotary cylinder (not shown) included in the tape transport system 320 is required to coincide with the relation between the rate of the data output from the terminal 300 at playback (corresponding to the time stamp frequency) and the rotational speed of the rotary cylinder. An embodiment for realizing such coincidence of relations is shown in FIG. 15.

Figure 15:
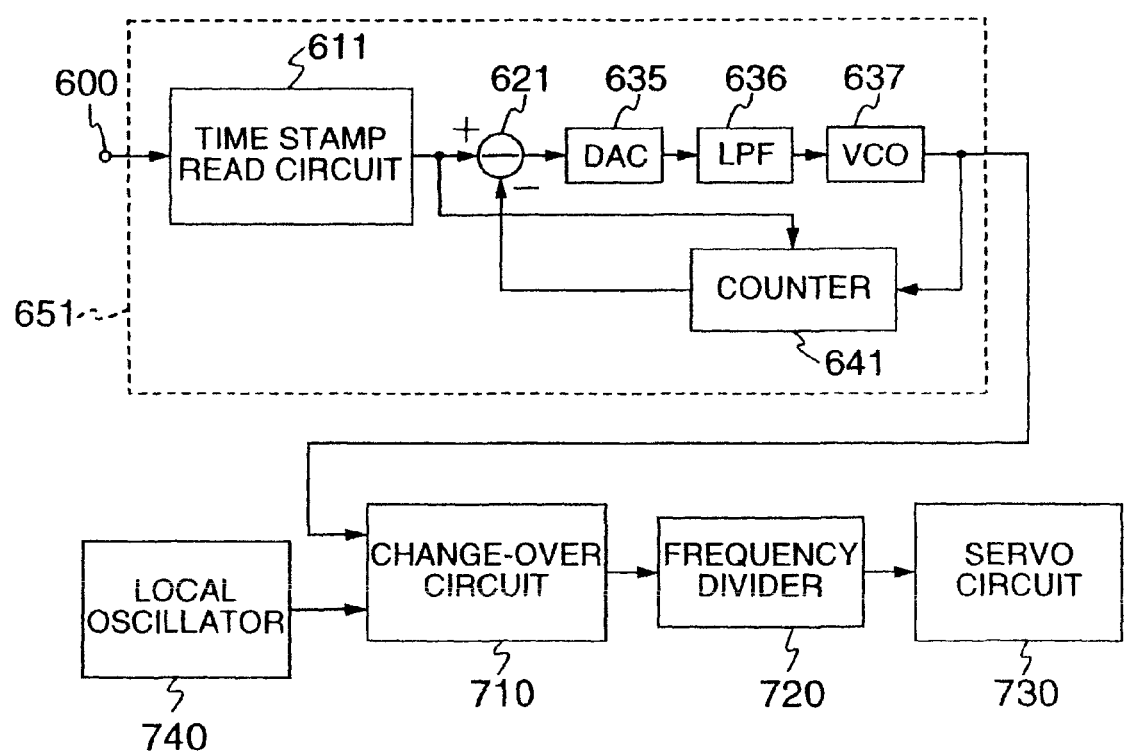
FIG. 15 is a block diagram showing a recording control scheme according to the invention.

In FIG. 15, numeral 600 designates an input terminal for a signal corresponding to FIG. 8(3) received at the interface circuit 305 shown in FIG. 6, numeral 611 a time stamp read circuit, numeral 621 a subtractor circuit, numeral 635 a D/A converter circuit, numeral 636 an LPF, numeral 637 a VCO, numeral 641 a counter circuit, numeral 651 a clock restoration circuit, numeral 710 a change-over circuit, numeral 720 a frequency divider circuit, numeral 730 a servo circuit, and numeral 740 a local oscillator of the time stamp clock.

First, the operation in recording mode is described. At recording, the changeover circuit 710 selects and outputs a signal from the VCO 637. The clock restoration circuit 651 shown in FIG. 15 can be realized in the same configuration as the clock restoration circuit 650 shown in FIG. 12. The clock restoration circuit 651 has the time stamp read circuit 611 read the time stamp of each packet from the signal input applied through the terminal 600, and the output signal of the time stamp read circuit 611 is applied to the subtractor circuit 621 and the counter. Subsequent operations are the same as those of the clock restoration circuit 650. The output signal of the VCO 637 is synchronized with the time stamp signal added to the packet signal input. The clock signal synchronized with the time stamp signal which is output from the clock restoration circuit 651 is applied to the change-over circuit 710. At recording, a signal from the VCO 637 is selected and output from the change-over circuit 710. The output signal from the change-over circuit 710 is applied to the frequency divider circuit 720, and after being frequency-divided at a predetermined dividing ratio, is applied to the servo circuit 730.

The servo circuit 730 controls the rotation of the rotary cylinder in such a manner that the rotary cylinder is in phase with the signal applied from the frequency divider circuit 720.

Now, the operation in playback mode is described. At playback, an output signal of the local oscillator 740 for time stamp clock applied to the change-over circuit 720 is selected and output, and the output signal is frequency-divided by the frequency divider circuit 720 and applied to the servo circuit 730. The servo circuit 730 controls the rotary cylinder in such a manner as to operate in phase with the reference signal applied thereto.

At recording, the rotation of the rotary cylinder is controlled on the basis of the clock synchronized with the time stamp signal, while at playback, the rotation of the rotary cylinder is controlled in such a manner as to be phase-locked to the time stamp clock signal for controlling the output of the reproduced data. At playback, therefore, the data output from the tape transport system can be synchronized with the data output from the interface, thereby eliminating any data overage or shortage in the process.

According to the embodiment shown in FIG. 15, a technique was described in which the clock is synchronized with the time stamp being applied for recording so that the relation between the rate of data input (corresponding to the time stamp frequency) and the rotational speed of the rotary cylinder (not shown) included in the tape transport system 320 coincides with the relation between the rate of data output from the terminal 300 at playback (corresponding to the time stamp frequency) and the rotational speed of the rotary cylinder. It is also possible to obtain the coincidence of the relations at the time of playback by controlling the cylinder rotation. An embodiment for such a case is shown in FIG. 16.

Figure 16:
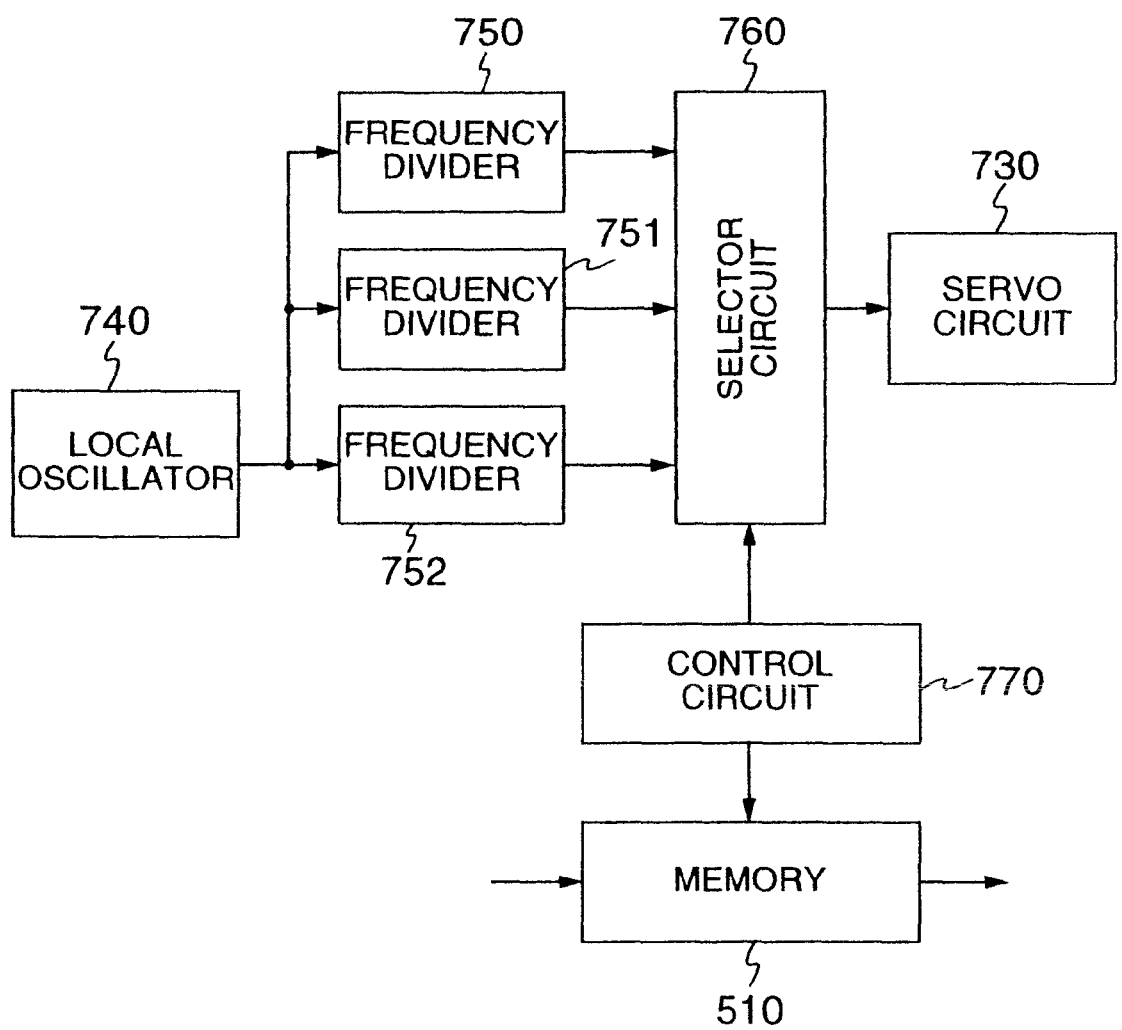
FIG. 16 is a block diagram showing a reproduction control scheme according to the invention.

In FIG. 16, the component parts are partially the same as the corresponding ones of the embodiment shown in FIG. 15, and the common parts are designated by the same reference numerals respectively. Numerals 750 to 752 designate frequency divider circuits, numeral 760 a selection circuit, and numeral 770 a control circuit.

At recording, the output signal of the local oscillator 740 for the reproduction time stamp is applied to the frequency divider circuit 751, where the input signal is frequency-divided at a predetermined dividing ratio, and the selection circuit 760 selects and outputs an output signal of the frequency divider circuit 751. The output signal of the selection circuit 760 is applied to the servo circuit for controlling the rotary cylinder in such a manner as to be synchronized in phase with a reference signal.

At playback, the output signal of the local oscillator 740 is applied to the frequency divider circuits 750 to 752. The dividing ratio of the frequency divider circuit 750 is set smaller and the dividing ratio of the frequency divider circuit 752 is set larger than that of the frequency divider circuit 751. As a result, the frequencies of the signals output from the respective frequency divider circuits are such that the output signal of the frequency divider circuit 750 is higher in frequency than that of the frequency divider circuit 751 while the output signal of the frequency divider circuit 752 is lower than that of the frequency divider circuit 751. Each output signal is applied to the selection circuit 760, and selectively output therefrom in accordance with the control signal from the control circuit 770. The output signal of the selection circuit 760 is applied to the servo circuit 730. The memory 510 is the same as the corresponding one shown in FIG. 11. The control circuit 770 for controlling the write and read operations of the memory 510 produces a selective control signal for the selection circuit 760.

The clock signal frequency for the signal shown in FIG. 8(3) with a time stamp added thereto and applied to the VTR 53 is substantially equal to the oscillation frequency of the local oscillator 740 but different in crystal accuracy. Even when a reference signal for the rotary cylinder is produced by frequency-dividing the output clock of the local oscillator 740 at a predetermined frequency divider circuit 751 at the time of recording, therefore, the fact that data is output from the memory 510 while watching the time stamp at playback leads to the fact that the data reproduced from the cylinder included in the tape transport system 320 and applied to the memory 510 fails to coincide with the data output from the memory 510 in an amount within the framework of the above-mentioned accuracy, resulting in an overage or a shortage of data a predetermined time later. In view of this, the control circuit 770 monitors the data overage and shortage, and when the data is in short supply, selectively outputs the output signal of the frequency divider circuit 750 thereby to increase the rotational frequency of the cylinder. When the data is on the increase, by contrast, the output signal of the frequency divider circuit 752 is selected to control the rotational speed of the cylinder downward. When it is decided that there is not any overage or shortage, the output signal of the frequency divider circuit 751 providing the same dividing ratio as for recording is selected.

As described above, a compressed signal can be recorded and reproduced in stable fashion by use of the invention.

Figure 17:
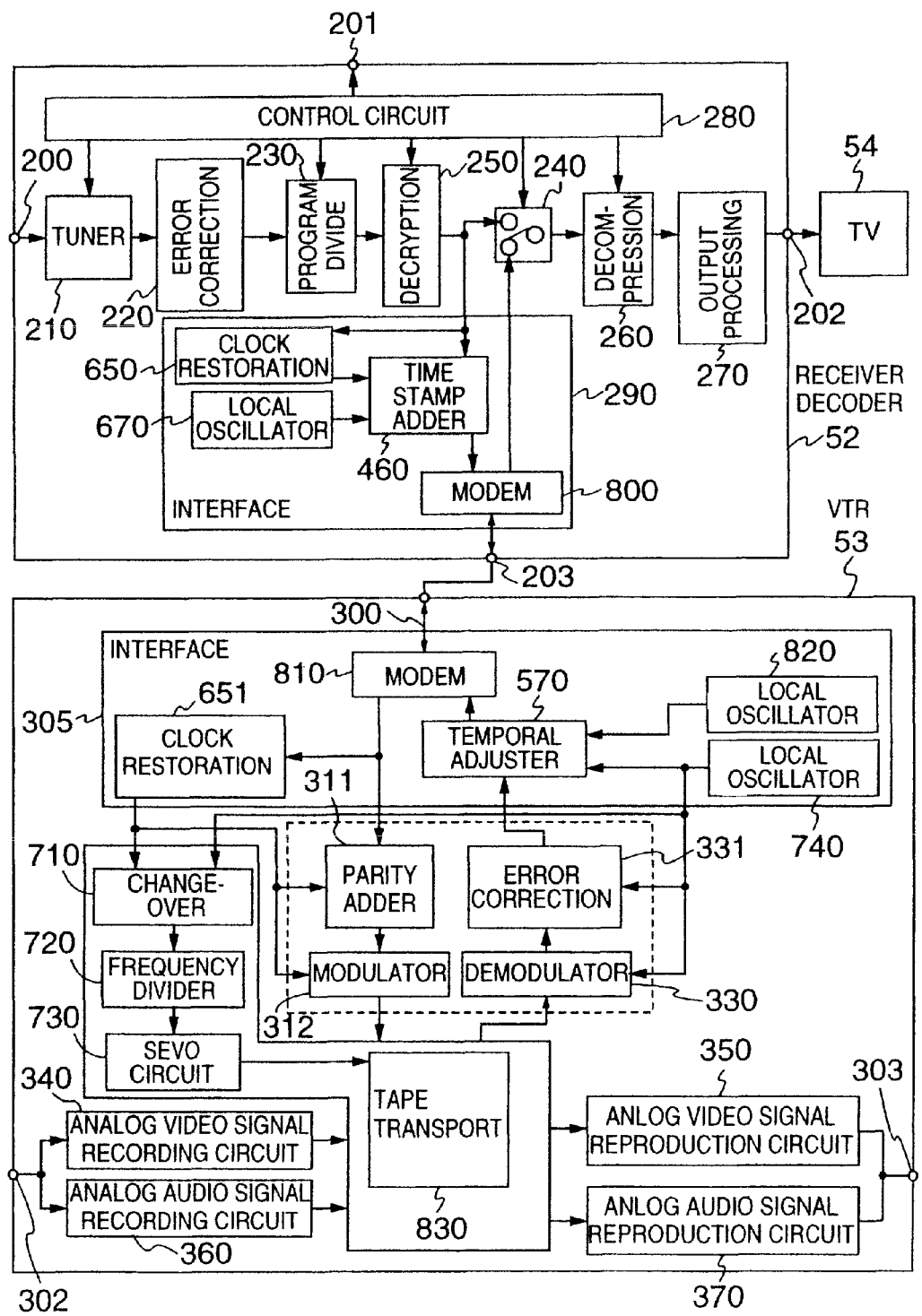
FIG. 17 is a block diagram showing a receiver decoder and a VTR according to the invention.

FIG. 17 is a block diagram showing the overall configuration of the receiver decoder 52 and the VTR 53 for when the time stamp clock and the bus clock have different frequencies. Although the receiver decoder 52 based on the embodiment of Fig. is shown, the effect is similar when the output signal of the change-over circuit 240 is decrypted on the basis of the embodiment shown in FIG. 4. The interface circuit 290 is shown on the basis of the embodiment of FIG. 14. In this case, the receiver decoder 52 and the VTR 53 are connected by a modulated signal. Numerals 800, 810 designate modem circuits for that purpose. As a result, the signal output from the terminal 402 shown in FIG. 14 is modulated at the modem circuit 800, output from the receiver decoder 52 through the terminal 203, and applied to the VTR 53 through the terminal 300.

The VTR 53 operates in a manner according to the embodiment of FIG. 6. The signal applied from the terminal 300 is applied to the interface circuit 305. The interface circuit 305 operates in accordance with the embodiment of FIG. 15. This circuit is supplied with a modulated signal, and therefore, the input signal from the terminal 300 is applied to and demodulated by the modem circuit 810. The demodulated signal is applied to the clock restoration circuit 651 and the parity adder circuit 311. The parity adder circuit 311 and the modulation circuit 312 process the signal in accordance with the clock signal restored at the clock restoration circuit 651. Numeral 830 designates a tape transport section of the tape transport system 320 shown in FIG. 6.

In FIG. 17, the local oscillator 740 generates a clock for the time stamp. This time stamp clock is used also for the reproduction signal processing at the demodulation circuit 330 and the error correction circuit 331. Numeral 820 designates a local oscillator for the bus clock.

Figure 18:
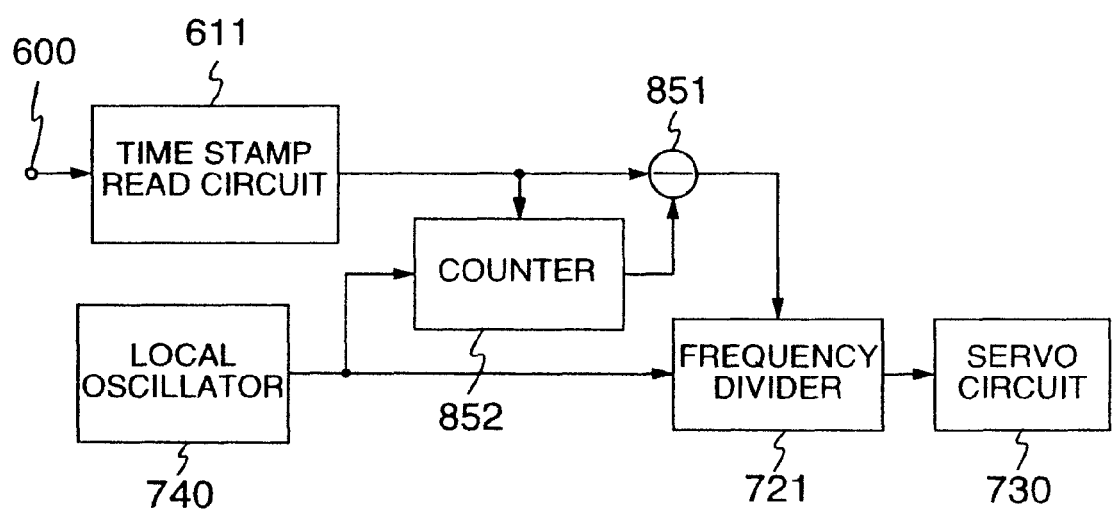
FIG. 18 is a block diagram showing a recording control scheme according to the invention.

In the embodiment shown in FIG. 17, the interface circuit for the VTR 53 and a part of the circuits of the tape transport system operates in the same manner as the corresponding parts of the embodiment of FIG. 15. Another embodiment is shown in FIG. 18. In the embodiment of FIG. 18, the frequency of the local oscillator 740 having an oscillation frequency equal to the time stamp clock frequency is compared with the time stamp of the input signal, and the rotation of the rotary cylinder is controlled in accordance with the time stamp. This can produce the same effect as the embodiment shown in FIG. 15. In FIG. 18, reference numeral 721 designates a frequency divider circuit, numeral 851 a subtractor circuit, and numeral 852 a counter circuit.

The signal input from the terminal 600 has the time stamp thereof read by the time stamp read circuit 611. The time stamp thus read is applied to the subtractor circuit 851 and the counter circuit 852. A clock signal of a frequency equal to the time stamp clock is output from the local oscillator 740, and is applied to the counter circuit 852 and the frequency divider circuit 721. The count on the counter circuit 852 is set by the time stamp applied thereto for counting the input clock signal. The output signal of the counter circuit 852 is applied to the subtractor circuit 851 where the difference with the input time stamp is taken, which difference is applied to the frequency divider circuit 721. The frequency divider circuit 721 frequency-divides the clock signal from the local oscillator 740, and thus produces a reference signal for the servo circuit 730. When the difference is applied from the subtractor circuit 851 in the process, the dividing ratio of the frequency divider circuit is finely adjusted in accordance with the difference, and the reference signal applied to the servo circuit 730 is synchronized with the time stamp signal input.

As described above, the rotation of the rotary cylinder can be controlled in synchronism with the time stamp input, with the result being that the recording operation of the VTR 53 can be performed in stable fashion. Although the digital signal is processed in a VTR according to the above-mentioned embodiment, the invention is not limited to such an application but the output of the interface circuit of the receiver decoder may be applied to another type of data storage device including a memory.

According to this embodiment, a digitally compressed video signal can be sent intermittently in the form of packets. Also, the signal can always be recorded and reproduced in stable fashion, thereby making it possible to restore the original time intervals of the packet signal.

Now, another embodiment is described with reference to FIGS. 19 to 30. This embodiment concerns the case in which the clock signal for the time stamp added to the packets received is identical in frequency with the clock signal for transmitting the packets.

Figure 19:
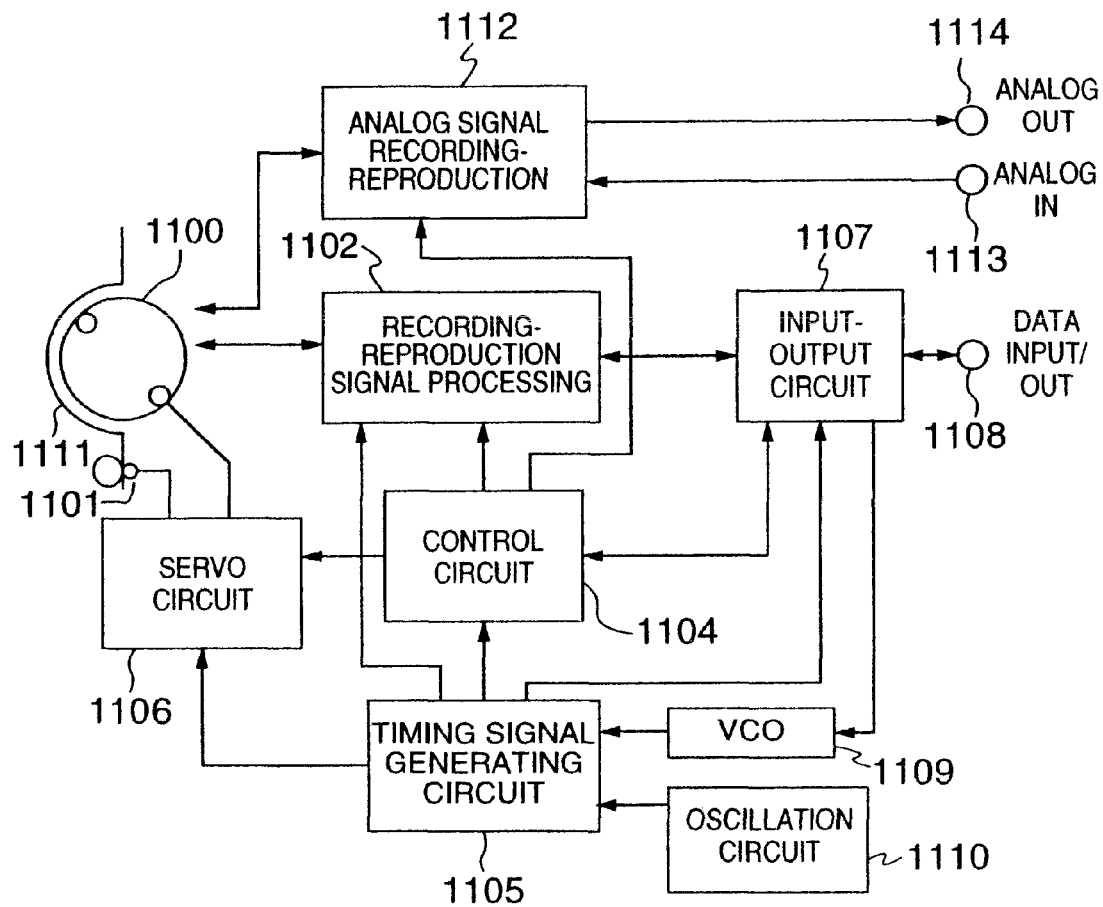
FIG. 19 is a diagram showing the configuration of a digital signal recording reproduction apparatus according to another embodiment of the invention.

FIG. 19 shows the configuration of a digital signal recording-reproduction apparatus. Numeral 1100 designates a rotary head, numeral 1101 a capstan, numeral 1102 a recording-reproduction signal processing circuit for generating a recording signal at recording and demodulating the reproduced signal at playback, numeral 1104 a control circuit such as a microprocessor for controlling the recording and playback modes, numeral 1105 a circuit for generating a timing signal providing a reference for the rotation of the rotary head 1100, numeral 1106 a servo circuit for controlling the rotary head and the tape feed rate, numeral 1107 an input-output circuit for inputting the recording signal or outputting the reproduced signal, numeral 1109 a voltage-controlled, oscillation circuit (VCO) for generating a reference clock for recording, numeral 1110 an oscillation circuit for generating a reference clock for reproduction, numeral 1111 a tape, and numeral 1112 a recording-reproduction circuit for the analog video signal.

At recording, the recording data in packet form are applied from the input-output terminal 1108 at given time intervals. A part of the packet data applied from the input-output terminal 1108 is applied through the input-output circuit 1107 to the control circuit 1104. The control circuit 1104 detects the type of the packet data, the maximum transmission rate, etc. by means of the information attached to the packet data or the information sent separately from the packet data, decides on a recording mode according to the detection result, and sets the operation mode of the recording-reproduction signal processing circuit 1102 and the servo circuit 1106. The input-output circuit 1107 detects the packet data to be recorded, and applies the detected packet data to the recording reproduction signal processing circuit 1102. The recording-reproduction signal processing circuit 1102 determines the number of packets to be recorded in a track according to the recording mode decided at the control circuit 1104, generates an error correction code, ID information, a sub-code or the like, generates a recording signal, and records the signal on the tape 1111 by means of the rotary head 1100.

At playback, first, the reproduction operation is performed in a given playback mode, and the ID information is detected at the recording reproduction signal processing circuit 1102. The control circuit 1104 decides on the recording mode to be used, and resets the operation mode of the recording reproduction signal processing circuit 1104 and the servo circuit 1106 for reproduction. The recording reproduction signal processing circuit 1104 detects a synchronization signal or detects and corrects an error in accordance with the reproduced signal from the rotary head 1100, reproduces the data, the sub-code or the like, and applies them to the input-output circuit 1107. The input-output circuit 1107 outputs the reproduced data from the input-output terminal 1108 on the basis of the timing signal generated at the timing signal generating circuit 1105.

At recording, the VCO 1109 is controlled at the rate of the recording data input from the input-output terminal 1108 and a reference clock for operation of the recording-reproduction apparatus is generated, while at playback, on the other hand, the clock generated by the oscillation circuit 1110 is used as a reference clock for the operation.

The recording and reproduction operation for an analog video signal will be described. At recording, the analog video signal applied from the input terminal 1113 is processed as predetermined at the analog recording-reproduction circuit 1112 and is recorded on the tape 1111 by means of the rotary head 1100. At playback, on the other hand, the video signal reproduced by the rotary head 1111 is processed in a predetermined way at the analog recording-reproduction circuit 1112, and then output from the terminal 1114. The head for analog recording may double as the head for digital recording or may be independently provided.

Figure 20:
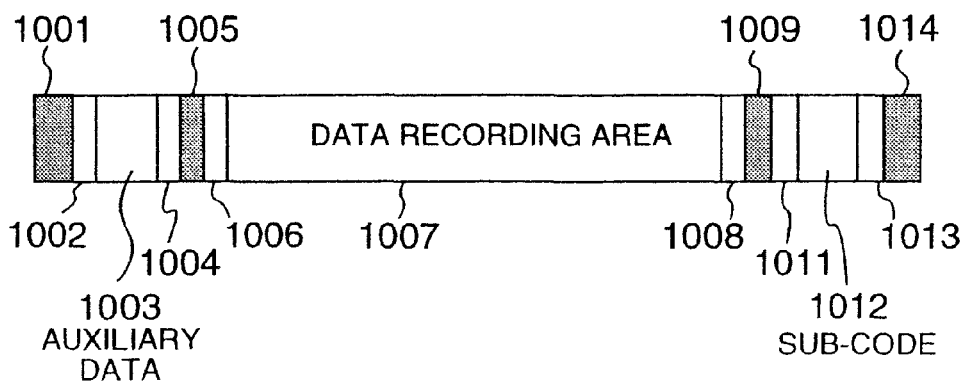
FIG. 20 shows a recording pattern of a track.

FIG. 20 shows a recording pattern of a track. Reference numeral 1003 designates an auxiliary data recording area for such signals as audio signal, numeral 1007 a data recording area for recording a digitally compressed video signal, numeral 1012 a sub-code recording area for recording sub-codes such as the time stamp and the program information, numerals 1002, 1006, ion preambles to the respective recording areas, numerals 1004, 1008, 1113 postambles to the respective recording areas, numerals 1005, 1009 gaps between the respective recording areas, and numerals 1001, 1014 margins at track ends. By forming a postamble, a preamble and a gap in each recording area, an independent post-recording from the respective areas is made possible. Needless to say, digital signals other than the digitally compressed video signal and the audio signal may be recorded in the recording areas 103 and 1007.

Figure 21A:
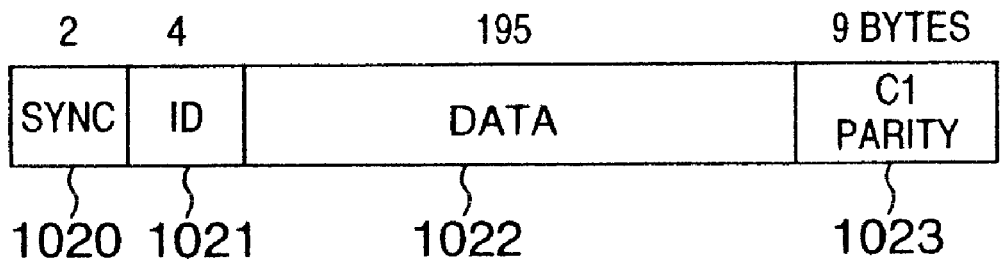
FIGS. 21A and 21B are diagrams showing the block structure of each area.
Figure 21B:
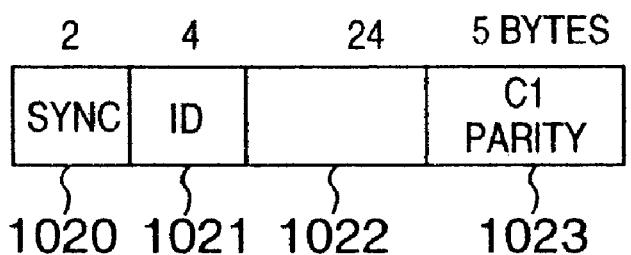

FIGS. 21A to 21B show a block composition of each area. A block composition of the auxiliary data recording area 1003 and the data recording area 1007 is shown in FIG. 21A. Reference numeral 1021 designates a synchronization signal, numeral 1021 ID information, numeral 1022 a video signal or an auxiliary data, and numeral 1023 a first parity (C1 parity) for error detection and correction. The synchronization signal 1020 is composed of two bytes, the ID information 1021 of four bytes, the data 1022 of 195 bytes, and the parity 1023 of 9 bytes. Each block consists of 210 bytes. FIG. 21B shows a block composition of the sub-code recording area 101-2. In the blocks of the sub-code recording area, the synchronization signal 1020 and the ID information 1021 are the same as those in FIG. 21A, and the data 1022 is composed of 24 bytes, while the parity 1023 consists of five bytes, each block being formed of 35 bytes which is one sixth of the bytes of the block in FIG. 21A. In this way, the number of bytes for each block is set in the ratio of integers and further the same composition of the synchronization signal 1011 and the ID information 1012 is employed for all the areas, whereby the generation of blocks for recording and the detection of the synchronization signal and the ID information can be processed with the same circuit.

Figure 22:
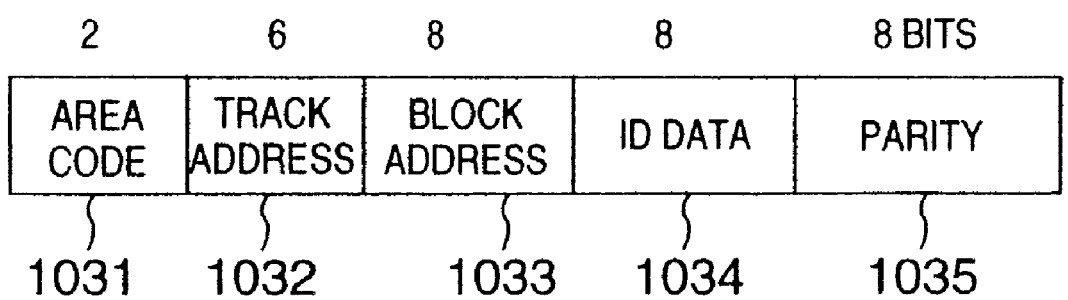
FIG. 22 is a diagram showing the structure of ID information.

FIG. 22 shows a composition of the ID information 1021. Numeral 1031 designates an area code, numeral 1032 a track address, numeral 1033 a block address within a track, numeral 1034 ID data, and numeral 1035 a parity for detecting an error of the area code 1031, the track address 1032, the block address 1033 and the ID data 1034. The area code 1031 is for identifying each area. The data recording area 1007, for example, is assigned "00", the auxiliary data recording area 1003 is assigned "10", and the sub-code recording area 1012 is assigned "11", for example. A plurality of types of codes, say, "00" and "01" may be assigned to the data recording area 1007, etc., to identify different data such as for variable-speed reproduction. The track address 1032 is for track identification, in which the address is changed for every one or two tracks. In this case, 64 or 128 tracks can be identified with a 6-bit address. The block address 1033 is for identifying the blocks of each recording area. The data recording area 1007 is assigned 0 to 157, the auxiliary data recording area 1003 is assigned 0 to 13, and the sub-code recording area 1012 is assigned 0 to 17, for example.

The track address 1032 is repeated for each 12 tracks or each multiple of 12 tracks, for example, in order to identify the third error correction code described later.

The C1 parity 1023 is added to the area code 1031, the track address 1032 and the block address in the data 1022 and the ID information 1021, for example. As a result, the ability to detect the block address or the like at playback can be improved.

Figure 23:
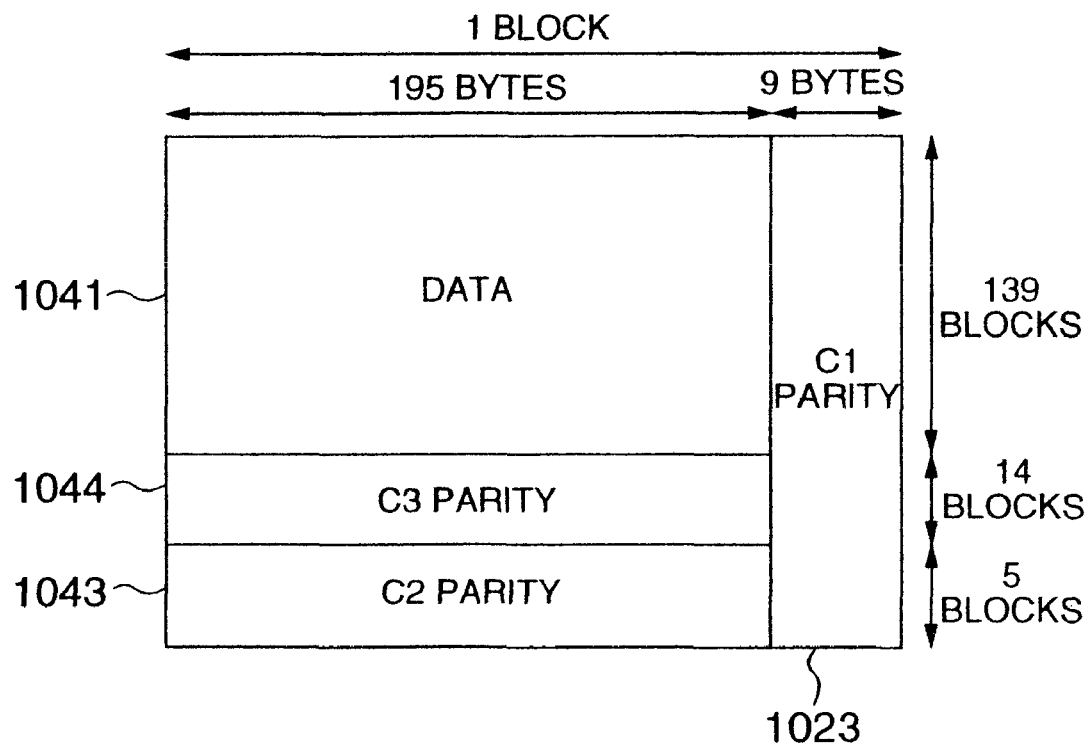
FIG. 23 is a diagram showing the data structure of a track in a data recording area.

FIG. 23 shows a data composition of each track in the data recording area 1007. The synchronization signal 1020 and the ID information 1021 are not shown. The data recording area 1007 is composed of 158 blocks, the first 139 blocks being for recording the data 1041, the next 14 blocks for recording the third error correction code (C3 parity) 1044, and the last five blocks for recording the second error correction code (C2 parity) 1043.

The C2 parity 1043 of five bytes, as compared with the C3 parity of 14 bytes, is added to the data of 139 bytes for each track. On the other hand, the C3 parity 1044 of seven bytes is added, for example, to each of the even- and odd-numbered blocks into which a 139-block data is divided for each 12 tracks. The Reed-Solomon code, for example, may be used as the error correction code.

Figure 24:
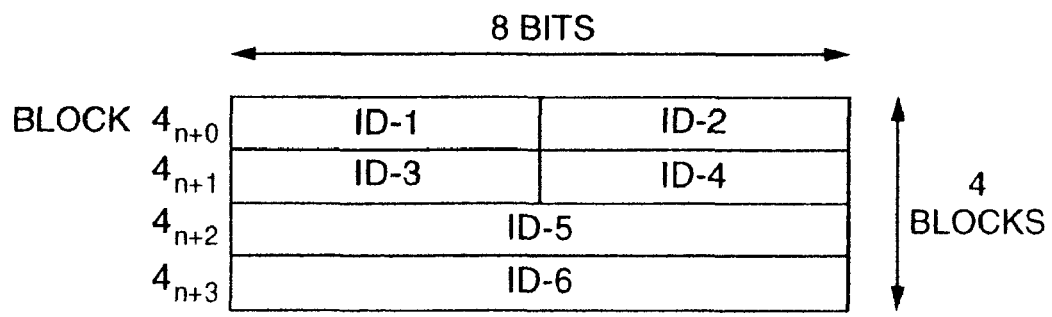
FIG. 24 is a diagram showing the structure of ID data in a data recording area.

FIG. 24 shows a composition of the ID data 1034 in the data recording area 1007. The ID datum 1034 is composed of, for example, four bytes from four blocks. This data is multiplex-recorded a plurality of times thereby to improve the detection ability at playback. The four-block data is composed of six types of data ID-1 to ID-6.

ID-1 specifies the recording format of the data recording area 1007. More specifically, a plurality of types of formats can be handled by changing the value of ID-1. In recording a digitally compressed video signal of packet form, for example, the ID-1 is set to "1".

ID-2 specifies the recording mode, i.e., the maximum recording rate. According to this embodiment, data of about Mbps can be recorded when using a 4-head rotary head for two-channel recording at the rotational speed of 1800 rpm. When the recording is carried out at the rate of once every two times (two tracks for each rotation), the recording rate is about 12.5 Mbps. If the recording is effected at the rate of once every four times, on the other hand, the recording rate is about 6.25 Mbps. In this case, if the tape feed rate is set to ½ or ¼, the track pattern on the tape is substantially the same. In similar fashion, the maximum recording capacity can be reduced to 1/n (n: positive integer) of 25 Mbps. At recording, the transmission rate of the recording data is identified and the optimum recording mode is set. The mode in which the recording operation is performed is recorded in ID-2. For example, "1" is recorded for 25 Mbps, "2" for 12.5 Mbps, and "3" for 6.25 Mbps.

ID-3 specifies the temporal compression mode, i.e., the temporal compression ratio for recording. This is applicable to a scheme in which a digital signal, after being temporally compressed, transmitted in a short time and recorded, is decompressed temporally for reproduction. This code is set to "1", for example, when the temporal compression is lacking, to "2" when the temporal compression ratio is two, and to "3" when the temporal compression ratio is four.

ID-4 is for specifying the number of channels of data recorded at the same time. In recording mode 1, for example, data of 12.5 Mbps can be recorded in two channels.

ID-5 specifies the number of packets recorded in each track, and ID-6 the length of packets recorded. The amount of data recorded in each track is controlled for each packet, and the number of packets is recorded, thereby making it possible to meet the requirement of a given transmission rate. The data amount can be controlled for each or a plurality of tracks. By recording the packet length, on the other hand, a packet of an arbitrary length can be handled successfully.

As described above, an efficient recording operation can be performed with a simple recording and reproduction processing by controlling the recording mode and the data amount recorded in each track in accordance with the transmission rate of the data recorded. At playback, first, the ID data 1034 is detected and the recording mode or the like is identified, followed by setting the reproduction processing circuit to the particular mode for reproduction.

The data amount can be controlled by bytes if the address of the last block is recorded in ID-5 and the position of the last data in ID-6 without any correspondence between packets and blocks.

Correspondence between the frames of the digital video signal to be recorded and the track for recording can be secured by setting the rotational speed of the rotary head to the same value as the frame frequency of the video signal or to a predetermined relation with the frame frequency of the video signal. When the rotational speed of the rotary head is identical to the frame frequency of the video signal, the same rotational speed can be used when the apparatus is applied also to the recording and reproduction of an analog video signal. Thus the same servo circuit can be used. The rotational speed is set to 1800 rpm, for example, for the frame frequency of 30 Hz, to 1800/1.001 rpm for 30/1.001 Hz, and to 1500 rpm for 25 Hz. In the case of digital recording, the rotational speed of the rotary head is proportional to the maximum recording rate, and therefore the maximum recording rate can be increased by increasing the rotational speed. With a double speed of 3600 rpm, 3600/1.001 rpm or 3000 rpm, for example, the maximum recording rate can be doubled. In consideration of the compatibility with the analog recording and reproduction, however, a very high maximum recording rate poses a problem. The rotational speed 5/4 times as high, i.e., 2250 rpm, 2250/1.001 rpm or 1875 rpm or thereabouts may be a choice.

Figure 26:
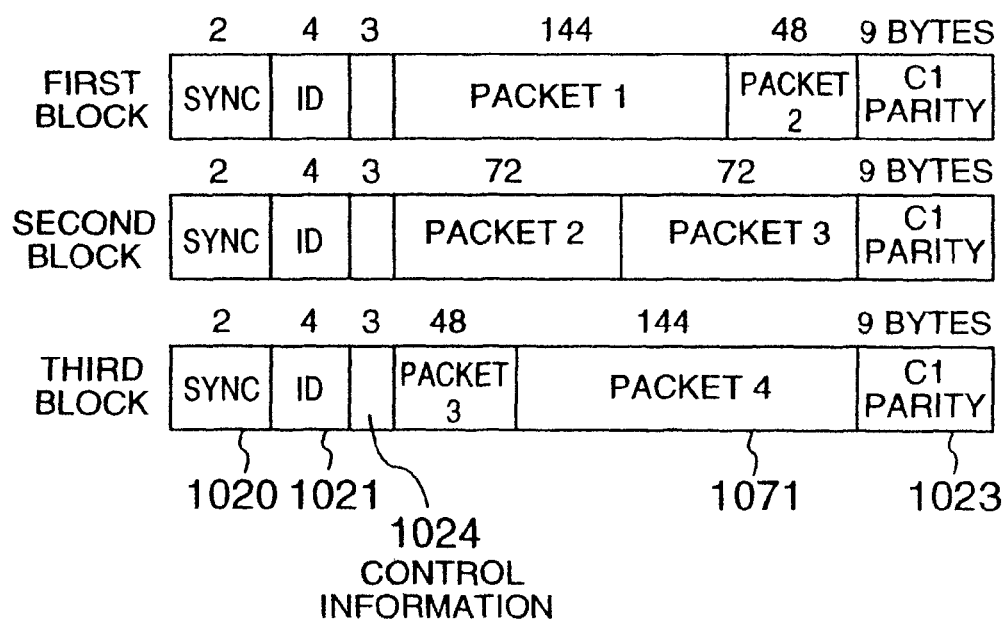
FIG. 26 is a diagram showing the block structure with the length of a packet set as 144 bytes.

FIG. 26 shows an example configuration of blocks for recording the digitally compressed video signal transmitted in packets in the data recording area 1041. A data of 195 bytes is composed of, for example, control information 1024 of three bytes for data and packets 1071 of 192 bytes. A packet of data is recorded in a block, i.e., in correspondence with a C1 code series, whereby a burst error which may occur due to a dropout or the like on the tape and make impossible correction by blocks is prevented from affecting a plurality of packets constituting units of transmission.

The control information 1024 is one associated with the contents of data, the recording time, the copy control data, or other information associated with the packet 1071. This information is recorded for three bytes of each block or for each 3×n bytes of n blocks.

FIG. 26 shows a composition of blocks when the length of the packet 1071 is set to 144 bytes. In this composition, four packets 1971 are recorded in three blocks.

Figure 25:
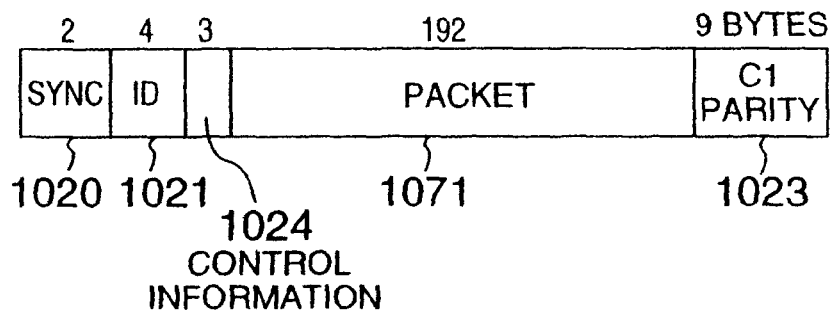
FIG. 25 is a diagram showing the block structure for recording the digitally compressed video signal transmitted in packets in a data recording area.
Figure 27:
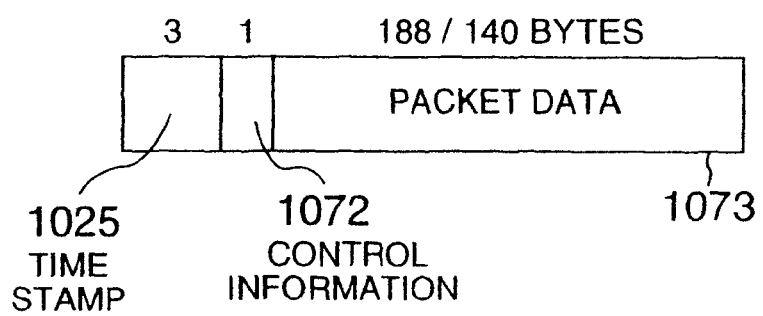
FIG. 27 shows the structure of a packet in FIG. 25 or 26.

FIG. 27 shows a composition of the packet 1071 shown in FIG. 25 or 26. The packet 1071 is composed of, for example, a time stamp 1025 of three bytes, control information 1072 of a byte for the packet, and packet data 1073 of 188 or 140 bytes. When the number of packets 1073 is smaller and the packet data is 130 bytes, for example, dummy data may be additionally recorded or the area for the control information may be increased.

The time stamp 1025 is information on the time at or during which a packet is transmitted. More specifically, the time at which the head of a packet is transmitted or the intervals between packets are counted with reference to a reference clock, and the count is recorded in a packet together with the packet data. At playback, the particular information is used for setting the intervals between packets. The data can thus be produced in the same form as when transmitted.

As described above, by making arrangements to express the relation between the number of bytes in each packet and that in each block in a simple ratio of n:m in integers and to record a number m of packets in a number n of blocks, efficient recording is made possible even when the packet length is different from the recording area for each block. The characters n and m represent a value smaller than the number of bytes for each packet and the number of bytes for the recording area of each block, respectively. If these values can be expressed in an integral number of 10 or less, the processing is facilitated. The recording operation can be performed in similar fashion also when the length of a packet is longer than the recording area of a block (n>m). Further, even with packets of different lengths, the recording and reproduction operation can be done easily by employing the same format of information such as the time stamp. Different packet lengths can be identified by reference to the recording format of ID-1 shown in FIG. 25 or the packet length specified in ID-6. Packets can, of course, be recorded in packed state without any correspondence with the blocks. Such a scheme can be applied also to the case wherein each packet has 192 bytes or more.

When a number m of packets are recorded in a number n of blocks, on the other hand, the packets recorded in each track can be easily managed by setting the number of blocks in a recording area to a multiple of n. In the case of FIG. 26, for example, the number of blocks of the data recording area 1007 for recording the data is set to 138. Then, 184 packets can be recorded in a track. Nothing may be recorded or other information may be recorded in the remaining one block.

Figure 28:
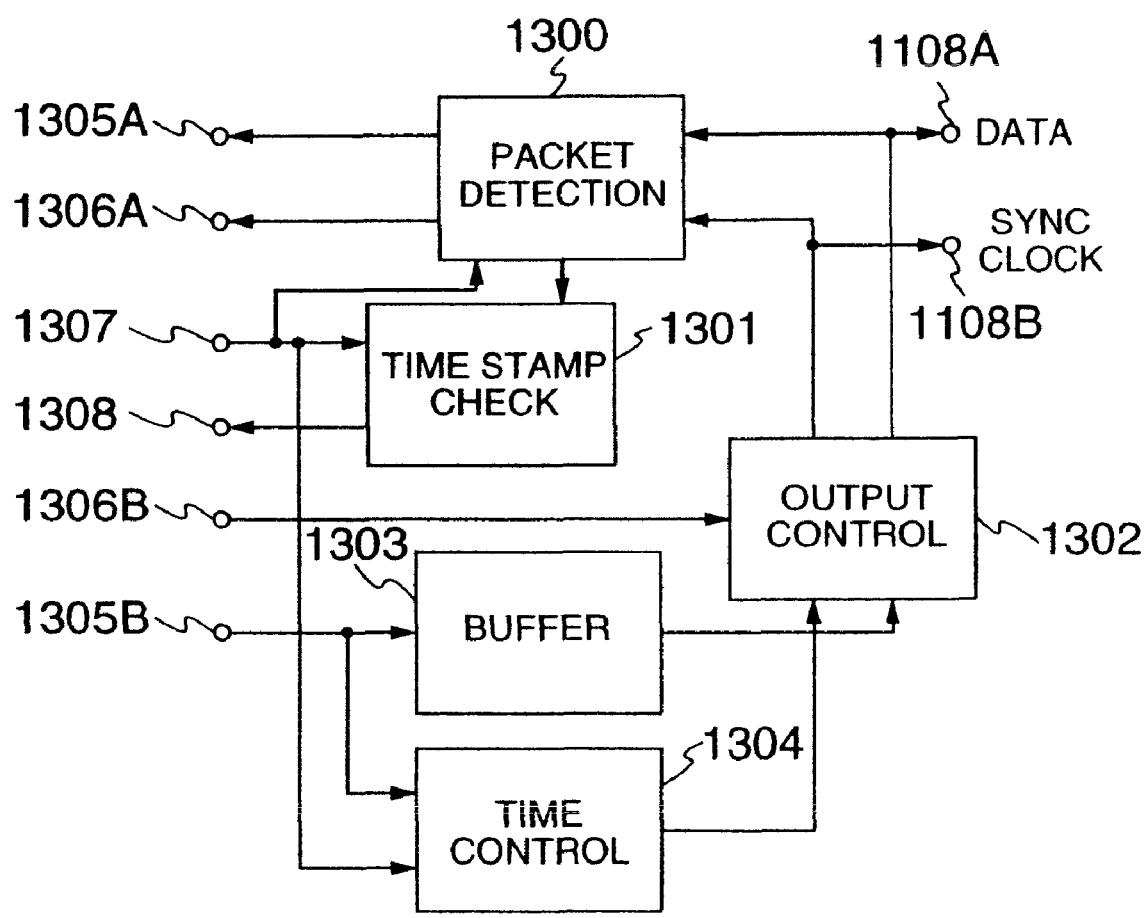
FIG. 28 is a diagram showing the configuration of an input-output circuit.

FIG. 28 shows a configuration of the input-output circuit 1107 shown in FIG. 19. Reference numeral 1300 designates a packet detection circuit, numeral 1301 a time stamp check circuit, numeral 1302 an output control circuit, numeral 1303 a buffer, and numeral 1304 a time control circuit. The transmission rate of the data input to or output from the input output terminal 1108A, i.e., the frequency of the clock signal is assumed to be the same as the reference clock for the recording-reproduction apparatus transmitted from the VCO 1109 or the oscillation circuit 1110.

Figure 29:
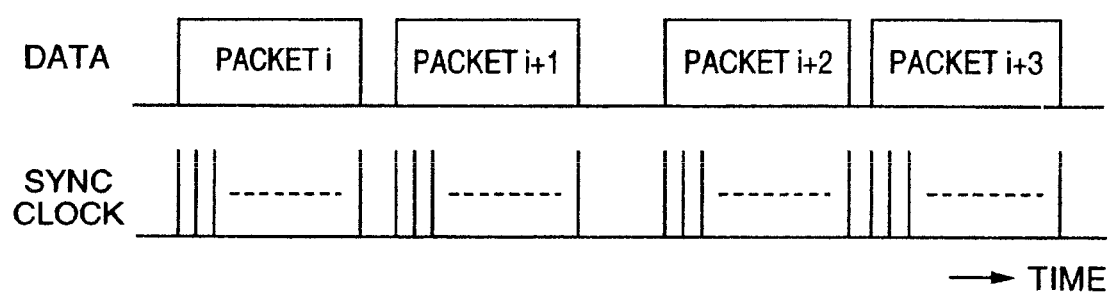
FIG. 29 shows the timings of an input-output signal.

At recording, the packet data and the clock signal are applied from the input-output terminals 1108A and 1108B at the timing shown in FIG. 29. As shown in FIG. 29, the packet data 1071 including a packet i, a packet i+1, a packet i+2, a packet i+3, and so on (i: integer) are applied at irregular time intervals. The packet data and the clock signal thus input are applied to the packet detection circuit 1300, and packets are detected by the clock output from the timing signal generating circuit 1105 and applied from the input terminal 1307. The packet 1071 detected is applied from the output terminal 1305A to the recording-reproduction signal processing circuit 1102 for recording. The control signal and the like sent with the packet are output to the control circuit 1104 from the output terminal 1306 for identifying the packet type and determining the recording mode or the like. Also, the time stamp 1025 attached to each packet is applied to the time stamp check circuit 1301.

The time stamp check circuit 1301 compares the time stamp 1025 with the packet interval counted by the clock applied from the input terminal 1307. When they are different, the VCO 1109 is controlled in such a manner as to correct the difference by the control signal output from the output terminal 1308. More specifically, the VCO 1109 is controlled in such a manner that the rate of data input is synchronized with the reference clock generated from the VCO 1109.

At playback, the output control circuit 1302 is controlled to the output mode by the control signal input from the control circuit 1104 through the input terminal 1306B, and the reproduced packet 1071 is output in synchronism with the reference clock generated at the oscillation circuit 1110. The reproduced packet input from the recording-reproduction signal processing circuit 1102 through the input terminal 1305B is stored in the buffer 1303. Also, the time stamp 1025 in the packet is applied to the time control circuit 1304. The time control circuit 1304 generates a clock signal and controls the timing of reading and outputting a packet from the buffer 1303 by means of the time stamp 1025 and the clock input from the input terminal 1307. The clock signal is output at the same timing as shown in FIG. 29, i.e., at the timing when the recording data is input. As a result, apparatuses for receiving and processing reproduced packets including the devices for decoding digitally compressed video signals or other digital signal recording-reproduction apparatuses can process a recorded or reproduced signal in the same manner as an unrecorded signal.

As described above, when the transmission rate of the input-output data, i.e., the frequency of the clock signal is identical to that of the reference clock of a recording-reproduction apparatus, or when the transmission rate is the same as the frequency of the reference clock divided by an integer multiple thereof, then an input-output circuit can be easily constructed without using any PLL or the like. The frequency of the reference clock must be set to an integer multiple of the rotational speed of the rotary head since it is necessary to generate a reference signal for the rotation of the rotary head. The rotational speed of the rotary head is desirably synchronized with the frame frequency of the video signal as described above. As a result, if the transmission rate is synchronized with the rotational speed of the rotary head or the frame frequency of the video signal, the reference clock of the recording-reproduction apparatus can be easily set and constructed. The transmission rate of course may be synchronized with the field frequency.

Assume that the transmission rate is set to 50.4 MHz that is 840 times higher than 60 kHz, for example. Sixty kHz is an integer multiple, i.e., a common multiple of all the frame frequencies including 30 Hz, 30/1.001 Hz and 25 Hz and the field frequency thereof twice higher than the frame frequency. It is also an integer multiple of 2250 rpm. Further, since 840=8×3×5×7, various frequency-dividing clocks can be easily generated by setting the reference clock to the same 50.4 MHz as the transmission rate. When it is enough to handle only a specific frame frequency, an integer multiple of the particular frame frequency or the field frequency can be employed with equal effect.

Figure 30:
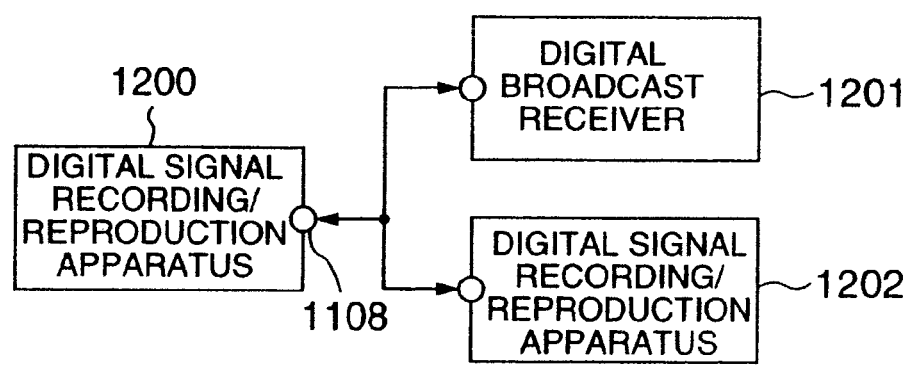

FIG. 30 shows an example connection between the digital signal recording-reproduction apparatus shown in FIG. 19 and a digital broadcast receiver or other digital signal recording-reproduction apparatuses. Reference numeral 1200 designates the digital signal recording-reproduction apparatus shown in FIG. 19, numeral 1201 a digital broadcast receiver, and numeral 1202 another digital signal recording reproduction apparatus. The digitally compressed video signal and the like received by the digital broadcast receiver 1201 or the digitally compressed video signal or the like reproduced by another digital signal recording-reproduction apparatus 1202 is applied from the input-output terminal 1108 to the digital signal recording-reproduction apparatus 1200 for recording. Also, the digitally compressed video signal and the like reproduced at the digital signal recording-reproduction apparatus 1200 is applied through the input-output terminal 1108 to the digital broadcast receiver 1201 or another digital signal recording-reproduction apparatus 1202. The digital broadcast receiver 1201 processes the input signal the same way as at the time of normal receiving, and generates and applies the video signal to a TV set or the like. The digital signal recording-reproduction apparatus 1202 processes the input signal in a predetermined way for recording.

Although an input-output circuit for a digital signal recording-reproduction apparatus is described above, the foregoing embodiment is similarly applicable to the input-output circuits of other devices such as the digital broadcast receiver 1201 or the like. With the digital broadcast receiver or the like, the reference clock for demodulation of the video signal, for example, can be easily synchronized with the transmission rate by setting the transmission rate to an integer multiple of the frame frequency.

Also, instead of the terminal acting both as an input and an output used in the above-mentioned embodiment, independent terminals may be employed for input and output.

According to this embodiment, the frequency of the clock signal, i.e., the transmission rate of a recording-reproduction signal is set to an integer multiple of the field or frame frequency of the video signal or the rotational speed of the rotary head of a recording-reproduction apparatus, thereby making it possible to synchronize the operation of the recording-reproduction apparatus with the input-output signal easily. Also, the cases with different transmission rates or different formats of the recording signal can be easily handled by applying an input or an output for each packet with a predetermined number of bytes.

What is claimed is:

1. An apparatus for reproducing a digitally compressed video signal in the form of fixed length packets from a recording medium, each of the fixed length packets including a fixed length time stamp and a fixed length control information, the time stamp indicating an output timing of the fixed length packet, the apparatus comprising:

a reproduction circuit which reproduces the fixed length packets from the recording medium; a memory for storing the reproduced fixed length packet a local oscillator which generates a clock signal;

a counter which counts the clock signal generated by the local oscillator; and an output circuit which generates an output packet signal by deleting the fixed length time stamp and the fixed length control information from the each fixed length packet read from the memory, and outputs the output packet signal so that the output packet signal is outputted when a value of the time stamp of the fixed length packet is matched with a count value counted by the counter.

2. A method of reproducing a digitally compressed video signal in the form of fixed length packets from a recording medium, each of the fixed length packets including a fixed length time stamp and a fixed length control information, and the time stamp indicating an output timing of the fixed length packet, the method comprising the steps of:

reproducing the fixed length packet from the recording medium;

storing the reproduced fixed length packets in a memory;

reading the fixed length time stamp of the each reproduced fixed length packet;

generating a clock signal;

counting the clock signal;

generating an output packet signal by deleting the fixed length time stamp and the fixed length control information from the each fixed length packet read from the memory; and outputting the output packet signal so that the each output packet signal is outputted when a value of the time stamp of the fixed length packet is matched with a count value of the clock signal.

\* \* \* \* \*